(12) United States Patent
Mathea

(10) Patent No.: US 11,938,682 B2
(45) Date of Patent: Mar. 26, 2024

(54) METHOD FOR PRODUCING A THREE-DIMENSIONAL SHAPED OBJECT BY MEANS OF LAYER-BY-LAYER MATERIAL APPLICATION

(71) Applicant: dp polar GmbH, Eggenstein-Leopoldshafen (DE)

(72) Inventor: Hans Mathea, Eggenstein-Leopoldshafen (DE)

(73) Assignee: 3D Systems GmbH, Morfelden-Walldorf (DE)

( * ) Notice: Subject to any disclaimer, the term of this patent is extended or adjusted under 35 U.S.C. 154(b) by 222 days.

(21) Appl. No.: 17/291,295

(22) PCT Filed: Oct. 25, 2019

(86) PCT No.: PCT/EP2019/000298
§ 371 (c)(1),
(2) Date: May 5, 2021

(87) PCT Pub. No.: WO2020/094246
PCT Pub. Date: May 14, 2020

(65) Prior Publication Data
US 2022/0001627 A1 Jan. 6, 2022

(30) Foreign Application Priority Data

Nov. 6, 2018 (DE) .................. 10 2018 008 704.3
Nov. 9, 2018 (DE) .................. 10 2018 008 808.2

(51) Int. Cl.
*B29C 64/40* (2017.01)
*B29C 64/336* (2017.01)
(Continued)

(52) U.S. Cl.
CPC ............ *B29C 64/40* (2017.08); *B29C 64/336* (2017.08); *B29C 64/35* (2017.08); *B33Y 10/00* (2014.12);
(Continued)

(58) Field of Classification Search
CPC ....... B29C 64/336; B29C 64/35; B29C 64/40; B29C 64/106; B29C 64/188;
(Continued)

(56) References Cited

U.S. PATENT DOCUMENTS 5,156,700 A * 10/1992 Berman ................ B29C 64/188
156/196
6,169,605 B1 1/2001 Penn et al.
(Continued)

FOREIGN PATENT DOCUMENTS

DE 102015212569 A1 1/2017
DE 102016122131 A1 5/2018
(Continued)

OTHER PUBLICATIONS

Berlac AG, "Berlac Dual Cure UV-Klarlack" 2016, (Downloaded from the Internet Jun. 29, 2021).

*Primary Examiner* — Nahida Sultana
(74) *Attorney, Agent, or Firm* — The Webb Law Firm

(57) ABSTRACT

In a method for producing a three-dimensional mold and a three-dimensional shaped object by means of layer-by-layer material application, geometry data for the shaped object, a support part having a base surface for holding the three-dimensional shaped object, and a first and a second material that can be solidified are made available. In the solidified state, the second material includes at least one main component that can be cross-linked by means of treatment with energy, and a latent hardener that can be thermally activated, (Continued)

by means of which chemical cross-linking of the main component can be triggered by means of the effect of heat. To form a negative-shape layer, the first material is applied to the base surface and/or to a solidified material layer of the three-dimensional shaped object situated on this surface, in accordance with the geometry data, in such a manner that the negative-shape layer has at least one cavity that has a negative shape of a material layer of the shaped object to be produced. The negative-shape layer is solidified. To form a shaped-object layer, the cavity is filled with the second material, and afterward its main component is partially cross-linked by means of treatment with energy, and solidified. Regions of the solidified negative-shape layer and/or shaped-object layer that project beyond a plane arranged at a distance from the base surface are removed by means of material removal. The steps mentioned above are repeated at least once. The main component is further cross-linked by means of a heat treatment, and solidified in such a manner that the second material has a greater strength than the solidified first material and the second material after partial cross-linking. The negative-shape layers are removed from the shaped object.

21 Claims, 24 Drawing Sheets

(51) Int. Cl.

| | | |
|---|---|---|
| | *B29C 64/35* | (2017.01) |
| | *B33Y 10/00* | (2015.01) |
| | *B33Y 40/20* | (2020.01) |
| | *B33Y 70/10* | (2020.01) |
| | *B29K 29/00* | (2006.01) |
| | *B29K 33/00* | (2006.01) |
| | *B29K 63/00* | (2006.01) |
| | *B29K 86/00* | (2006.01) |

(52) U.S. Cl.
CPC ............... *B33Y 40/20* (2020.01); *B33Y 70/10* (2020.01); *B29K 2029/00* (2013.01); *B29K 2033/08* (2013.01); *B29K 2063/00* (2013.01); *B29K 2086/00* (2013.01)

(58) Field of Classification Search
CPC ... B29C 64/205; B29C 64/245; B29C 64/264; B29C 64/241; B29C 70/58; B29C 70/06; B33Y 40/20; B33Y 10/00; B33Y 30/00; B33Y 70/10
See application file for complete search history.

(56) References Cited

U.S. PATENT DOCUMENTS

| | | | |
|---|---|---|---|
| 2002/0100750 A1* | 8/2002 | Shi | G05B 19/4099 |
| | | | 219/121.72 |
| 2013/0011562 A1 | 1/2013 | Varanka et al. | |
| 2013/0295338 A1 | 11/2013 | Keating et al. | |
| 2017/0348902 A1 | 12/2017 | Ohara et al. | |
| 2018/0099453 A1 | 4/2018 | Cambron | |
| 2019/0322039 A1 | 10/2019 | Bursch et al. | |
| 2020/0016819 A1 | 1/2020 | Mathea et al. | |

FOREIGN PATENT DOCUMENTS

| | | | | |
|---|---|---|---|---|
| DE | 102017001276 A1 | | 8/2018 | |
| DE | 102020 127 477 | * | 4/2021 | ............ B33Y 10/00 |
| JP | H740445 A | | 2/1995 | |
| JP | 2017164981 A | | 9/2017 | |
| WO | WO 97/09125 | * | 3/1997 | ............... B05C 5/00 |
| WO | 2015105047 A1 | | 7/2015 | |
| WO | 2018067901 A1 | | 4/2018 | |

* cited by examiner

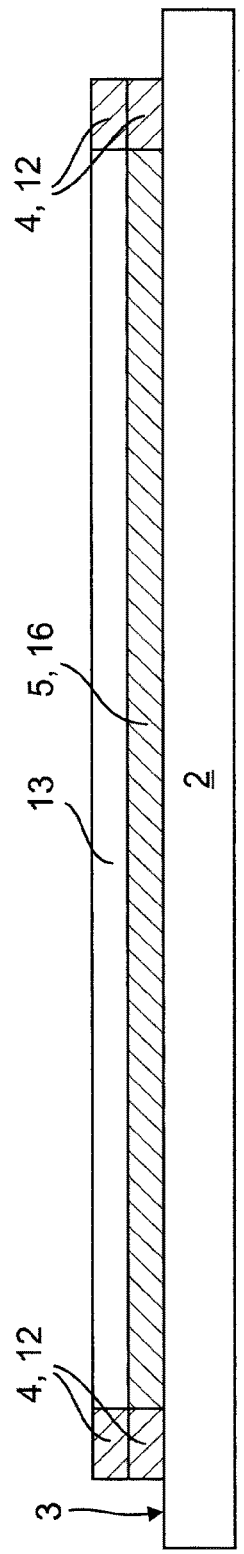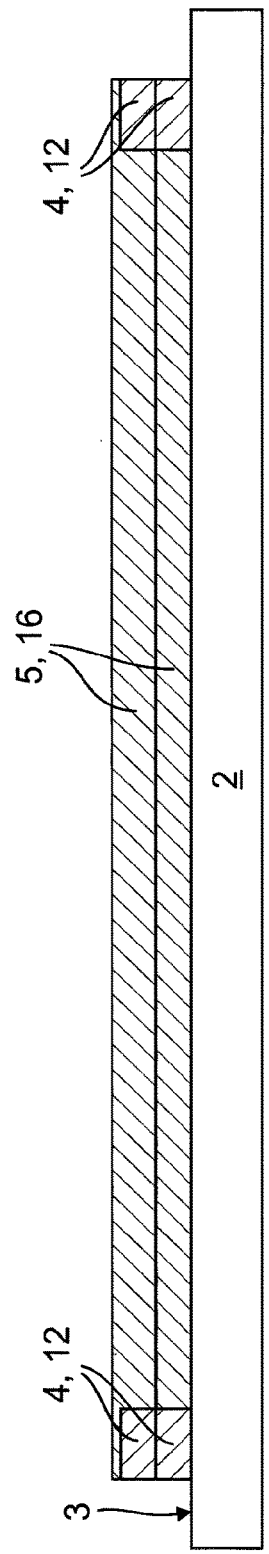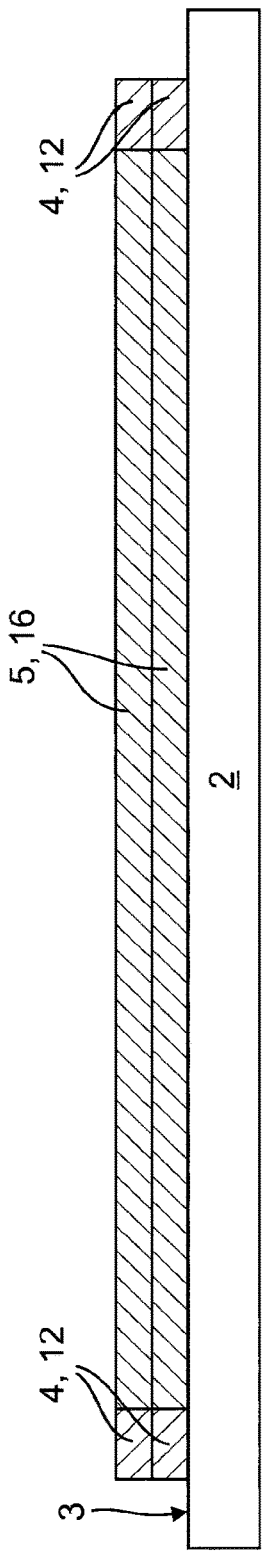

METHOD FOR PRODUCING A THREE-DIMENSIONAL SHAPED OBJECT BY MEANS OF LAYER-BY-LAYER MATERIAL APPLICATION

CROSS-REFERENCE TO RELATED APPLICATIONS

This application is the United States national phase of International Application No. PCT/EP2019/000298 filed Oct. 25, 2019, and claims priority to German Patent Application Nos. 10 2018 008 704.3 filed Nov. 6, 2018 and 10 2018 008 808.2 Nov. 9, 2018, the disclosures of which are hereby incorporated by reference in their entirety.

BACKGROUND OF THE INVENTION

Field of the Invention

The invention relates to a method for producing a three-dimensional shaped object by means of layer-by-layer material application, wherein geometry data for the shaped object, a support part having a base surface for holding the three-dimensional shaped object, a liquid or flowable first material that can solidify, and a liquid, flowable, paste-like or powder-form second material that can solidify are made available.

Description of Related Art

In the case of such a method, known from practice, liquid polymers are used as the first and the second material, which polymers can be solidified under the effect of ultraviolet radiation. In the case of the previously known method, first a first material layer is applied to the base surface of the support part, in that droplet-shaped material portions of the first and the second material are sprayed onto different locations of the base surface using an inkjet printer. The locations at which the material droplets composed of the different materials are applied to the base surface are selected as a function of geometry data made available for the shaped object to be produced, in such a manner that the regions of the material layer that consist of the second material form a lowermost layer of the shaped object to be produced. The first material serves as a support material that is applied to the base surface at locations where no second material is applied, and above which the shaped object has overhangs after application of a further material layer of the first material, which overhangs are supposed to be supported by the support material until solidification of all the material layers. The lowermost material layer obtained in this manner is irradiated with ultraviolet radiation in a further step, so as to solidify polymers contained in the first and in the second material by means of cross-linking.

After the lowermost material layer has been completed, further material layers are applied to it in corresponding manner and solidified, until all the layers of the shaped object have been produced and solidified. Afterward, the layer stack obtained in this manner is brought into contact with the solvent until the first material has dissolved in it. The second material is not soluble in the solvent.

The previously known method does make it possible to produce three-dimensional shaped objects as prototypes or in small numbers, in comparatively cost-advantageous manner. Good surface quality is achieved by means of the use of polymers that can be cross-linked using UV light, and due to the high resolution when printing. However, a very low viscosity of the polymers is required for high-resolution 3D printing, so that these can be applied to the base surface or to a solidified material layer situated on it through fine jets.

In the inkjet printing method (InkJet method), the jets can usually process a maximum viscosity of 25 m Pa·s. Higher viscosities generally cannot be dispensed through jets. The objects produced from such materials are only able to withstand minimal stresses and can only serve as a display object.

From practice, it is also already known to produce an injection-molding mold for an injection-molding machine from a liquid polymer that can be solidified, by means of layer-by-layer material application using an inkjet 3D printer. The injection-molding mold has two mold parts, between which a cavity is formed, which has a three-dimensional negative shape of a shaped object to be produced in the injection-molding machine. The injection-molding mold is produced in the 3D printer by means of application of a plurality of layers of the polymer, which is applied in liquid form to a base surface or to a solidified material layer previously applied to this surface, using jets. After application of each material layer, the polymer, which is still liquid, is irradiated with UV light, in each instance, so as to cross-link it and thereby to solidify the material layer in question. Then further material layers are applied and solidified in corresponding manner, until the injection-molding mold has been completed. Subsequently, the injection-molding mold is removed from the 3D printer and installed in the injection-molding machine, and a hot plastic that differs from the polymer is injected into the cavity through the injection openings provided in the injection-molding mold. After the cavity has been filled with the plastic and the plastic has cooled, the injection-molding mold is opened and the shaped object is ejected from the cavity using ejectors. The method has the disadvantage that molds produced using 3D printing have only a very limited useful lifetime due to the high temperature of the material filled into them, and must be replaced after approximately 10 to 100 injection-molding processes. Furthermore, installation of the injection-molding mold into the injection-molding machine is relatively time-consuming. This is particularly disadvantageous in the case of individual production of a shaped object.

In the case of other known technologies that use solids as a construction material, thermoplastics are generally melted and applied layer by layer through a jet or in the form of a powder, using the sintering method. The relatively good ability to withstand stress, however, is achieved at the cost of the printing time (very slow) or low resolution and/or surface quality.

The stereolithography method, with which higher viscosities can also be processed, offers a slight advantage. This advantage results from the fact that the materials do not have to be sprayed through a jet, but rather are cross-linked using an external UV beam, after being provided in a polymer container. So-called two-component UV polymers having even further improved properties can also be processed in this way. As a result, better ability of the shaped objects to withstand stress is also achieved. The disadvantages, however, are: large amounts of material for production of an object, limited curing time of the two-component mixture, great material consumption (does not allow re-use of the polymers not used up). All this clearly increases the costs of parts production.

Other than the inkjet method, all known 3D technologies have yet another serious defect: They are not multi-materialcapable. This means that only one material type can be used at a time. As a result, usability of the method in industry is very limited.

SUMMARY OF THE INVENTION

It is therefore the task of the invention to indicate a method of the type stated initially, with which mechanically stable three-dimensional shaped objects that are able to withstand stress can be printed at high resolution.

This task is accomplished with the characteristics as described herein. According to the invention, a method for producing a three-dimensional shaped object by means of layer-by-layer material application is provided, in which geometry data for the shaped object, a support part having a base surface for holding the three-dimensional shaped object, a liquid or flowable first material that can solidify, and a liquid, flowable, paste-like or powder-form second material that can solidify are made available, wherein the second material comprises at least one main component that can be cross-linked by means of treatment with energy, and a latent hardener that can be thermally activated, by means of which chemical cross-linking of the main component can be triggered as the result of the action of heat, a) wherein for the formation of a negative-shape layer, material portions of the flowable first material are applied to the base surface and/or to a solidified layer of the three-dimensional shaped object situated on this surface, in accordance with the geometry data, in such a manner that the negative-shape layer has at least one cavity on its surface facing away from the base surface, which cavity has a negative shape of a material layer of the shaped object to be produced, b) wherein the negative-shape layer is solidified, c) wherein for the formation of a shaped-object layer, the cavity is filled with the second material in such a manner that the negative shape is transferred to the shaped-object layer as a positive shape, d) wherein the main component of the second material filled into the cavity is cross-linked by means of treatment with energy, and solidified, e) wherein regions of the solidified negative-shape layer and/or of the solidified shaped-object layer projecting beyond a plane arranged at a predetermined distance from the base surface are removed by means of material removal, f) wherein steps a) to e) are repeated at least once, g) wherein the main component of the shaped object formed from the shaped-object layers are further cross-linked by means of heat treatment, and solidified, in such a manner that the second material has a greater strength than the solidified first material and/or the partially cross-linked second material, and h) wherein the negative-shape layers are removed from the shaped object before, during and/or after the heat treatment is carried out.

According to the invention, a hybrid method is therefore provided, in which materials having different properties are processed by means of different printing methods and/or are applied, layer by layer, to the base surface or to a solidified material layer of the three-dimensional shaped object situated on this surface, by means of different printing apparatuses. This can take place in a continuous 3D printing process, i.e. the method can be carried out completely in a 3D printing station. No further printing process outside of the 3D printing station is required.

The first material can have a very low viscosity or be inviscid or highly flowable, because it merely serves for producing a mold for the second material. Because of the low viscosity or the great flowability that the first material demonstrates during application onto the base surface or onto a material layer of the three-dimensional shaped object situated on this surface, the mold can be printed by means of a digital printing method, with high resolution and good surface quality, in that a plurality of correspondingly small material portions of the first material is applied to the base surface or to the solidified material layer of the three-dimensional shaped object situated on this surface.

Only low demands are made regarding the mechanical stability and strength of the material layer of the mold consisting of the first material, since the mold merely needs to carry the second material and to support possible forces that act on the first material during the printing process provided for application of the second material. By means of the solidification of the first material, this material achieves sufficient strength so that it can act as a shaper for the second material. The mechanical strength of the first material in the solidified state has no influence on the mechanical stability of the shaped object formed from the solidified layers of the second material, because the first solidified material is removed from the shaped object after application of all the material layers.

The second material is the actual construction material for the shaped object and can have properties different from the first material, above all greater viscosity. For example, it can be filled with reinforcing additives, such as fibers and/or other solid particles. Since the second material is geometrically shaped by being molded in the mold produced from the first material, it is not necessary to apply small material portions of the second material to the base surface or to the solidified material layer of the three-dimensional shaped object situated on this surface in order to achieve high print resolution. Instead, it is also possible to work with a highly viscous second material. As a result, great mechanical stability and strength of the shaped object can be achieved. If necessary, it is even possible that the second material contains a mixture of at least two different substances and/or at least one additive, such as fibers or other substances, for example, for increasing the material strength. The second material can also be applied to the base surface or to the solidified material layer of the three-dimensional shaped object situated on this surface, in roughly selective or partially selective manner, using a digital printing process, in other words by means of applying a plurality of material portions to different locations, which are selected in accordance with the geometry data made available for the shaped object. In order to guarantee gap-free filling of the cavities at their contours, the second material is filled into the geometry data regions with contour overlap. This leads to the result that the amount of the second material is always slightly greater than would be needed for filling the cavity. It is also possible to apply the second material to the base surface or to the solidified material layer of the three-dimensional shaped object situated on this surface, using an analog printing process. A mixing apparatus that precedes the printing module allows graduated material properties by means of a single printing module. For this purpose—as needed—at least two material components are mixed directly ahead of being filled into the printing module, in a correspondingly adapted ratio. Thus, for example, a hard mixture can be changed to a soft mixture, in graduated manner. In this regard, it is even possible to apply two or more components of the second material to the base surface and/or to a solidified material layer situated on this surface, so as to produce a shaped object that contains multiple different components. This type of multi-material capability can be achieved by means of placing multiple printing modules for the second material in line, one behind the other. In this way, different mechanical and/or electrical properties and/or different colors can be achieved.

Because of the fact that in the case of the method according to the invention, preferably after printing of each individual material layer, regions of the solidified negative-shape layer and/or of the solidified shaped-object layer that project, in each instance, beyond a plane that is arranged above the base surface at a predetermined distance from it, preferably parallel to it, are removed by means of material removal, the individual layers of the shaped object run precisely parallel to and are arranged in a predetermined arrangement relative to one another, and have a predetermined layer thickness. Furthermore, "contaminants" that can occur on the surface of the uppermost layer of the first material when the cavities are filled with the second material when the second material makes contact with this surface are removed by means of the material removal. Removal of the regions projecting beyond the plane therefore ensures that the mixed layer consisting of the solidified first and second material always has the desired thickness, and that it is free of the second material, which is to be removed, at the surface of the first material. This allows very precise and low-distortion production of the shaped object. The material removal preferably takes place by means of machining, in particular by means of what is called a thickness-milling tool, a grinding tool and/or a polishing tool.

It is true that a 3D printing method is also known from practice, in which a shaped object is produced from a low-viscosity material by means of layer-by-layer material application, using an inkjet printer. In this regard, the individual material layers are each solidified after application, by means of irradiation with UV radiation. In addition to this, heat treatment of the shaped object is carried out after application of all the material layers, during which treatment mechanical stresses in the shaped object are reduced, and the material of the shaped object is solidified even more. However, this method is not suitable for printing materials that contain a hardener that can be activated by heat, because this hardener would be activated by the waste heat that occurs in the printing head of the 3D printer, with the result that the material would already harden in the printing head and would clog it. For this reason, the shaped objects produced using the previously known method allow only comparatively slight mechanical strength.

In the case of the method according to the invention, the regions of the solidified negative-shape layer and of the solidified shaped-object layer that project beyond the plane arranged at the predetermined distance from the base surface, preferably parallel to it, are removed after each application of a shaped-object layer, by means of material removal. Using the method according to the invention, it is therefore possible to produce shaped objects completely in a printer, without another process being required.

According to the invention, the main component of the individual shaped-object layers is partially or weakly cross-linked in step d), by means of treatment with energy, to such an extent that the shaped-object layers regain their shape. The main component of the second material can comprise at least one monomer, at least one oligomer and/or at least one polymer, which can be cross-linked by means of treatment with energy.

Treatment with energy is understood to mean a suitable electromagnetic radiation, preferably ultraviolet radiation, electron radiation and/or ion radiation. If ultraviolet radiation is used, the second material preferably contains a photo-initiator.

In the subsequent chemical step h), triggered by means of heat, slow relaxation and final cross-linking of the second material is carried out, during which the main component of the shaped object formed by means of application of the individual shaped-object layers is further solidified. The composition of main component and hardener is preferably adjusted in such a manner that chemical cross-linking is only triggered starting from a predetermined temperature. This temperature can be adjusted by means of the selection of a corresponding hardener. Below this temperature, cross-linking either does not occur at all or only occurs very slowly. This allows sufficiently long usability of the material mixture, without the mixture already cross-linking in the printing module.

The heat treatment preferably takes place at temperatures of approximately 100° C. to 200° C., in particular at temperatures of approximately 120° C. to 180° C. Depending on the type of main component and the hardener, the heat treatment lasts for 15 to 90 minutes, in particular 30 to 75 minutes. After that time, a shaped object formed from homogeneous material is present.

Since step d) is only carried out after all the layers of the shaped object have been applied, only a single heat treatment needs to take place. The method according to the invention allows both rapid shape retention of the shaped object and great ability of the shaped object to withstand mechanical and/or chemical stress. This is the fundamental prerequisite for industrial suitability of the shaped object.

A two-stage hardening process for a clear varnish is known from an informational bulletin published on the Internet by BERLAC AG, Allmendweg 39, 4450 Sissach, Switzerland, having the title "BERLAC DUAL CURE UV-KLARLACK [clear varnish]." In this publication, a single-component varnish is applied to a finished shaped object as surface protection, in a single-layer method. However, the varnish is first fixed in place on the object using heat, and only afterward is it cross-linked by means of UV radiation, in a final step.

In a preferred embodiment of the invention, the material portions of the first material are preferably applied to the base surface and/or to the solidified negative-shape layer situated on this surface and/or to a solidified shaped-object layer by means of an inkjet printing method or by means of a powder application method (powder particle transfer), wherein the first material is a material that can be solidified by means of the application of energy, to which the energy is applied so as to solidify the negative-shape layer. Since the second material contains a hardener (cross-linking agent) that can be activated thermally and can already trigger a slight cross-linking reaction at an elevated room temperature, it is not suitable for the jets of high-resolution inkjet printers. The elevated temperature that can already be reached by means of the waste head of the printing head of an inkjet printer leads to a slow but steady increase in viscosity of the second material, and therefore the inkjet printer becomes unable to function after only a short period of time (hours) and possibly the printing head and/or the device for supplying the printing head with the second material (feed lines, supply container) will be damaged. The invention circumvents this serious disadvantage in that only the negative shape is printed, layer by layer, from the low-viscosity first material (support material), for example by means of the inkjet printer, and cross-linked by means of treatment with energy. In this regard, the mechanical strength of the first material does not play a role for the strength of the shaped object, because the first material is subsequently removed. In contrast, the actual high-viscosity second material for the shaped object can be deposited into the cavities of the negative shape layer by layer, and cross-linked, using methods that can process material mixtures having a higher viscosity.

In an advantageous embodiment of the method, the viscosity of the second material in the non-solidified state is greater, where applicable at least 10 times as great, particularly at least 200 times as great, and preferably at least 2000 times as great as the viscosity of the first material in the non-solidified state, and/or the flowable first material and the flowable, paste-like or powder-form second material have a solids proportion, wherein the solids proportion of the second material, in the non-solidified state of this material, is greater, where applicable at least 10 times as great, particularly at least 200 times as great, and preferably at least 2000 times as great as the solids proportion of the first material in its non-solidified state. This allows the production of a shaped object that demonstrates high surface quality and great surface precision, and, at the same time, excellent mechanical strength. Furthermore, the second material can be made available with a solids proportion (additives) in spherical or fiber-like form, which clearly improve the mechanical and/or electrical properties as compared with a corresponding material without solids proportions.

In a practical embodiment of the invention, the first material has a working viscosity suitable for jet application, which is less than 1000 mPa·s, particularly less than 100 mPa·s, where applicable less than 30 mPa·s, and preferably less than 10 mPa·s, and is applied to the base surface and/or to the solidified material layer of the three-dimensional shaped object situated on it in the form of droplets of liquid, at a resolution of at least 360 dpi, particularly at least 720 dpi and preferably at least 1440 dpi. This allows good surface quality of the shaped object. The second material is preferably heated as compared with room temperature, so as to change its flowability, preferably so as to increase it, i.e. to reduce its viscosity. Afterward, the second material, which has been heated to a working temperature, is applied to the base surface or to a solidified material layer situated on it.

It is advantageous if the main component of the second material comprises at least one epoxy, at least one oxetane, at least one functional (meth)acrylate, at least one vinyl ether or a mixture of at least two of these substances. The at least one vinyl ether serves as the co-reactant for acceleration of the S [sic—incomplete sentence in the German]. Furthermore, the second material can contain at least one usual photo-initiator and/or at least one additive for improving the final properties (strength, low mechanical tensions, chemical resistance).

In a preferred embodiment of the invention, the latent hardener contains dicyandiamide and/or acid anhydride and/or at least one blocked isocyanate and/or at least one carbodiimide. The temperature that is required, at a minimum, for triggering chemical cross-linking can be adjusted by means of selecting one of these substances or by means of combining multiple ones of these substances.

In an advantageous embodiment of the invention, the concentration of the hardener amounts to between 0.2 and 5% volume-percent, in particular between 1.2 and 4% volume-percent, and preferably between 2.2 and 3% volume-percent of the second material. It is practical if the concentration of the hardener is coordinated with the functionality or strength of the base material after radiation hardening.

In a further development of the invention, the second material is applied to the negative-shape layer by means of a partially selective, digital coating/metering method, as a function of the geometry data, in such a manner that at least one material portion of the flowable, paste-like or powder-form second material is dispensed into the at least one cavity, filling it completely, and locations of the negative-shape layer, preferably situated outside of the cavity, are not brought into contact with the second material, or are only brought into contact slightly. A partially selective coating method is understood to be a coating method in which the second material is applied to the negative-shape layer over the full area in the cavity and applied only to a partial region of the surface of the negative-shape layer outside of the cavity. Filling of the second material into the cavities can take place using jets that can be adjusted between an open position and a closed position by means of a valve or similar setting device. Synchronization of the valves as a function of the relative position between the cavities and the dispensing openings of the jets can take place by means of a controller. This is an advantage as compared with analog coating methods, in which the second material is applied over a large area, in other words not selectively, both within and outside of the cavities. The second material can have a property different from the first material when it is filled into the cavities; in particular, the second material can have a greater viscosity than the viscosity of the first material when it is applied to the base surface or to a solidified material layer of the three-dimensional shaped object situated on this surface.

In a preferred embodiment of the invention, the second material is a composite, which comprises a fluid and at least one additive, wherein the fluid, at room temperature, has a viscosity of at least 50 mPa·s and preferably of at least 1000 mPa·s, and wherein the additive has solid particles that are arranged in the fluid. The solid particles can comprise fibers, particularly carbon fibers, nano tubes, glass beads, graphene, styrene block copolymers, particularly styrene-ethylene-butylene-styrene (SEBS), nano/micro particles of solids as fillers and/or highly branched polyesterols and/or mixtures of them. The composite can be filled into the cavity/cavities at room temperature or warmed to a temperature higher than room temperature.

In a preferred embodiment of the invention, the second material has a greater viscosity and/or a greater solids proportion than the first material, wherein both the first and the second material are applied to the base surface and/or to a solidified negative-shape layer and/or shaped-object layer situated on this surface by means of an inkjet printing method, wherein in the case of the inkjet printing method, the first material is ejected from at least one first jet and the second material is ejected from at least one second jet, and wherein the exit opening of the second jet preferably has a greater cross-section and/or has a higher working pressure applied to it than the exit opening of the first jet, wherein particularly the diameter of the exit opening of the second jet is greater than that of the exit opening of the first jet. An inkjet printing method is understood to be a printing method in which the second material is ejected from the jet by means of a piezoelectric activator, in pulses and/or in portions (jetting). Because of the greater cross-section and/or higher working pressure of the second jet, inkjet printing of the highly viscous second material is made possible. The smaller cross-section of the exit opening of the first jet in comparison with the cross-section of the exit opening of the second jet and/or the higher working pressure of the second jet in comparison with the working pressure of the first jet makes it possible to apply the first material to the base surface or to a solidified material layer of the three-dimensional shaped object situated on this surface at high resolution.

The jets are placed at a small distance from the surface to which the second material is supposed to be applied. When a cavity is situated under the jet, the flow of the second material out of the material channel of the jet is activated. The second material is pressed out of the jet, and a strip of the second material is deposited onto the surface as it moves relative to the jet. After deactivation of the material replenishment, the jet moves over the surface without dispensing any material.

In a further development of the invention, a pressure, in particular a gas pressure is applied to the second material, and the second material, which has been put under pressure in this manner, is passed to at least one jet by way of at least one valve, wherein the exit opening of the jet is positioned relative to the support part along the base surface, and the valve is controlled to open and close as a function of the geometry data made available for the shaped object to be produced and as a function of the relative position between the jet and the support part, in such a manner that the material flow is released when the exit opening is positioned at the cavity in such a manner that the second material can be dispensed into the cavity by the jet, and that the material flow is blocked when the exit opening is not positioned at the cavity, in such a manner that the second material cannot be dispensed into the cavity by the jet. In this regard, the material flow can be released at or just ahead of the cavity, and can be blocked upon departure from the cavity or shortly afterward. The valve can be activated electromagnetically or by means of a piezo element.

Preferably, the exit opening of a jet is moved relative to the support part along a continuous line that runs within the cavity, and the liquid, flowable or paste-like second material is continuously dispensed from the exit opening into the cavity along this line. This allows continuous material application and therefore rapid progress of the work when filling the cavity/cavities with the second material. The second material can be supplied to the jet by means of a known micro-pump suitable for a continuous conveying process, or by applying a pressure to the second material. Conveying the second material out of the jet channel takes place either directly, by means of a piezo activator for high viscosities, by means of a piezo activator for a jet channel slide (closes/opens the jet channel), or it is pressed into the channel by means of compressed air or a pressure piston. In this regard, the compressed air can be electromagnetically activated by means of a solenoid valve.

In a further development of the invention, the second material is filled into the cavity by means of a flexographic printing method, a gravure printing method, an offset printing method, a screen printing method, a micro-metering method, by means of a doctor blade and/or a chamber doctor blade and/or a powder application method, in non-selective or partially selective manner. The second material is therefore filled into the cavity/cavities using an analog coating method, in non-selective or partially selective manner. In the case of a non-selective coating method, geometry-oriented control of the material application is completely eliminated. In the case of a partially selective coating method, control can be implemented very easily, because no high resolutions are necessary. This simplifies electronic control very efficiently and contributes to a cost reduction in the design of the overall method. It is true that 3D printing methods in which a highly viscous printing material (also a composite material that was previously mixed together from material components) is applied by means of a jet are known as such. In this regard, however, the shaped object is printed directly (digitally and selectively) in accordance with an electronic template, in other words without using a negative shape. However, these 3D printing methods only allow a low print resolution, because the jet diameter of the jet must be relatively great due to the high viscosity of the printing material.

In a further development of the invention, the second material filled into the cavity is brought into contact with solid particles, in particular with fibers, before partial cross-linking of its main component takes place, in such a manner that the solid particles penetrate into the second material situated in the cavity, in whole and/or in part. Since the solid particles are brought into contact with the second material only after the cavity is filled with the second material, the second material can be filled into the cavity by means of a jet, in a simple manner, without the danger of solid particles clogging the jet.

It is advantageous if the solid particles are applied to the mantle surface of a transfer roll as a solid-particle layer, and if the coated mantle surface is then positioned so close to the surface of the second material filled into the cavity that the solid-particle layer comes into contact with the second material, and the mantle surface of the transfer roll is at a distance from the second material. Since the second material comes into contact only with the solid particles, but not with the transfer roll, the second material is prevented from adhering to the transfer roll and contaminating it. The solid particles, on the one hand, and the mantle surface of the transfer roll, on the other hand, can be electrically charged, wherein the polarity of the electrical charges of the solid particles is opposite to the polarity of the electrical charges situated on the transfer roll, so that the solid particles remain adhering to the mantle surface of the transfer roll, i.e. are attracted by the surface. The second material filled into the cavity can be charged with charges having a polarity that is opposite the charges of the solid particles. In this way, the solid particles can be released from the mantle surface of the roll more easily when they get into the vicinity of the second material or come into contact with it. The fibers can also be supplied by means of a transport belt.

It is practical if the uppermost solidified negative-shape layer and/or the uppermost solidified shaped-object layer is/are cleaned to remove the residue that occurs during material removal. As a result, a level and clean surface occurs, onto which a further material layer can be applied with great precision.

In a preferred embodiment of the invention, the support part that has the base surface is rotated about an axis of rotation during the material application and, if necessary, during solidification of the materials, and preferably displaced along the axis of rotation. In this way, interruption-free printing of a plurality of material layers arranged one on top of the other is made possible. This allows rapid material application and contributes to high product quality.

In an advantageous embodiment of the invention, a solvent is made available, in which the solidified first material is soluble, and the negative-shape layers are brought into contact with the solvent before, while and/or after the heat treatment is carried out, in such a manner that the solidified first material dissolves in the solvent. The solidified second material is insoluble in the solvent. As a result, the first material can be removed from the shaped object in a simple manner.

In the case of another advantageous embodiment of the invention, the negative-shape layers are removed from the shaped object before, while and/or after the heat treatment is carried out, by means of a phase conversion of the solidified first material. In this regard, the first material can be a wax or a similar material, for example, which is melted and, if applicable, evaporated by means of heating it.

It should still be mentioned that the second material can also be applied to the base surface and/or to a solidified material layer of the three-dimensional shaped object situated on this surface in powder form. In this regard, the second material can be contained in a supply container that is delimited, in certain regions, by the mantle surface of a transfer roll that is driven to rotate about its cylinder axis. The transfer roll is electrostatically charged by means of a charging corona, in such a manner that powder particles contained in the second material are transferred to the mantle surface of the transfer roll and form an electrostatically charged powder layer having a predetermined thickness there. Charging of the powder particles is achieved by means of what is called the triboelectric effect, for example, in that the powder particles build up a controllable electrostatic potential as the result of rubbing against one another. The base surface or the solidified material layer of the three-dimensional shaped object situated on this surface is electrostatically charged with the type of charge (positive or negative) that is opposite to the type of charge of the powder layer (negative or positive), and moved past the mantle surface of the transfer roll so closely that the charged powder particles of the powder layer are transferred to the base surface or the solidified material layer situated on this surface by means of electrostatically induced forces, and deposit into the cavity or cavities of the negative shape. There the powder particles are fixed in place by means of a suitable fixation agent. During fixation, the powder particles are connected with one another and with the base surface or the solidified material layer situated on this surface. In a further processing step, regions of the solidified negative-shape layer and/or of the solidified shaped-object layer that project beyond a plane arranged at a predetermined distance from the base surface are removed by means of material removal, as was already explained above.

BRIEF DESCRIPTION OF THE DRAWINGS

In the following, exemplary embodiments of the invention are explained in greater detail, using the drawings. These show.

DESCRIPTION OF THE INVENTION

Figure 1:
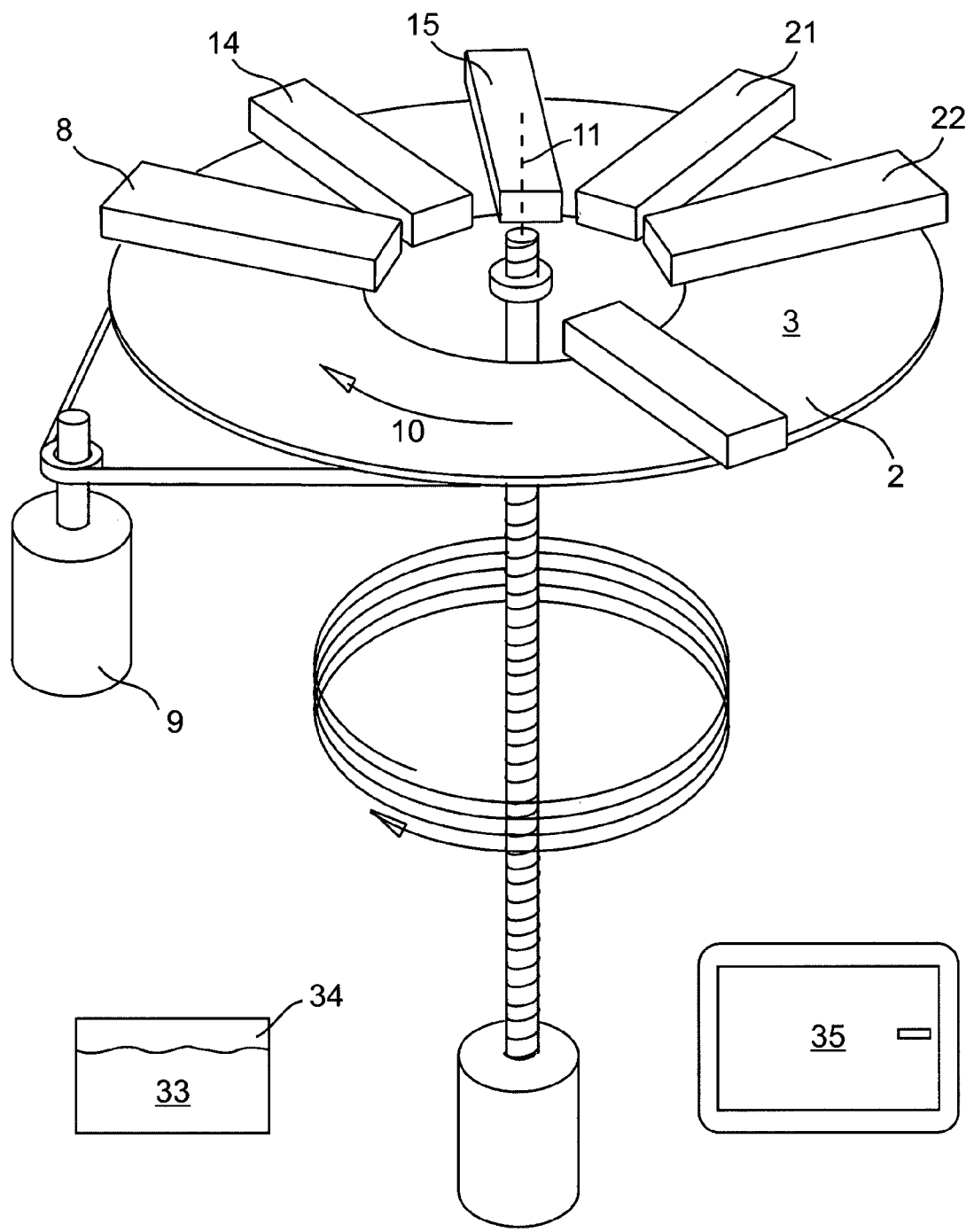
FIG. 1 a preferred apparatus in a polar embodiment, for producing a three-dimensional shaped object by means of layer-by-layer material application, wherein the apparatus has different dispensing devices for dispensing different liquid materials that can be solidified, FIG. 2 a side view of an apparatus for producing a three-dimensional shaped object, wherein the apparatus has a first dispensing device, which has jets for layer-by-layer application of a liquid first material and a second material application station configured as a flexographic printing apparatus or a gravure printing apparatus for application of a liquid second material, FIG. 3A to 3F a cross-section through a shaped object during different method steps of its production, FIG. 4 a side view of a material removal unit during removal of a material layer, FIG. 5 a cross-section through a first exemplary embodiment of a shaped object after application of all the material layers, FIG. 6 a schematic representation of the solidified material layers of the shaped object consisting of the first and second material, wherein the layers are shown in transparent form, FIG. 7 a three-dimensional view of a layer stack consisting of the material layers of the first and second material, FIG. 8 a three-dimensional view of the shaped object after removal of the material layers of the first material, using a solvent, FIG. 9 a cross-section through a second exemplary embodiment of a shaped object after application of all the material layers, FIG. 10 a cross-section through the second exemplary embodiment of the shaped object after removal of the material layers of the first material, FIG. 11 a side view of an apparatus similar to FIG. 2, wherein, however, a rotation screen printing apparatus is provided in place of the flexographic printing apparatus, FIG. 12 a side view of an apparatus similar to FIG. 2, wherein, however, a chamber doctor blade coating apparatus is provided in place of the flexographic printing apparatus, FIG. 13 a representation similar to FIG. 2, wherein, however, the second dispensing device of the apparatus has multiple printer modules with which shaped-object layers can be produced, which each consist of multiple different materials, FIG. 14 a cylindrical coating roll, FIG. 15 a conical coating roll, FIG. 16 a side view of an apparatus similar to FIG. 2, wherein, however, an inkjet printing apparatus for higher viscosities is provided in place of the flexographic printing apparatus, FIG. 17 a side view of an apparatus similar to FIG. 2, wherein, however, a micro-metering/micro-coating apparatus is provided in place of the flexographic printing apparatus, FIG. 18 an enlarged detail from FIG. 17, which shows a jet during filling of a cavity with the second material, FIG. 19 a micro-metering/micro-coating apparatus, which, in addition to the components shown in FIG. 17, has a device for applying solid particles, FIG. 20 an enlarged detail from FIG. 19, which shows the device for applying the solute particles, FIG. 21 a side view of an apparatus for producing a three-dimensional shaped object, wherein the apparatus has a device for applying solid particles, FIG. 22 a representation similar to FIG. 2, wherein, however, the second dispensing device has multiple reservoirs for different material components and a mixer for mixing the material components, FIG. 23 a schematic representation of a print-head module for applying the second material, FIG. 24 a cavity that was filled with the second material, FIG. 25 a micro-metering unit having a jet that has a circular exit opening, and FIG. 26 a micro-metering unit having a jet that has a rectangular exit opening for increasing the size of the coating surface.

In a method for producing a three-dimensional mold and a three-dimensional shaped object 1 by means of layer-by-layer material application, geometry data for the shaped object 1 are made available by a control unit that communicates with a computer on which software is running. Furthermore, a plate-shaped support part 2 having a base surface 3 arranged in a horizontal plane, for holding the shaped object 1, is made available. As can be seen in FIG. 1, the base surface 3 essentially has the shape of a circular ring disk. However, other embodiments are also conceivable, in which the base surface 3 particularly can have the shape of a full circular disk or can be configured to be rectangular.

Furthermore, in the method a liquid first material 4 that can be solidified, a liquid second material 5 that can be solidified, different from the first, and water as a solvent for the solidified first material 4 are made available. The solidified second material 5 cannot dissolve in the solvent. The first material 4 contains a polymer and a photo-initiator that brings about cross-linking of the polymer when treated with ultraviolet radiation.

The second material 5 has a greater viscosity than the first material 4 and contains an epoxy as the main component, which is mixed with a photo-cross-linking agent. The photo-cross-linking agent brings about cross-linking of the main component when treated with ultraviolet radiation. In addition to the photo-cross-linking agent, the second material 5 contains a latent hardener that can be thermally activated and triggers chemical cross-linking of the main component when the second material 5 is heated to a temperature of at least 120° C.

Figure 2:
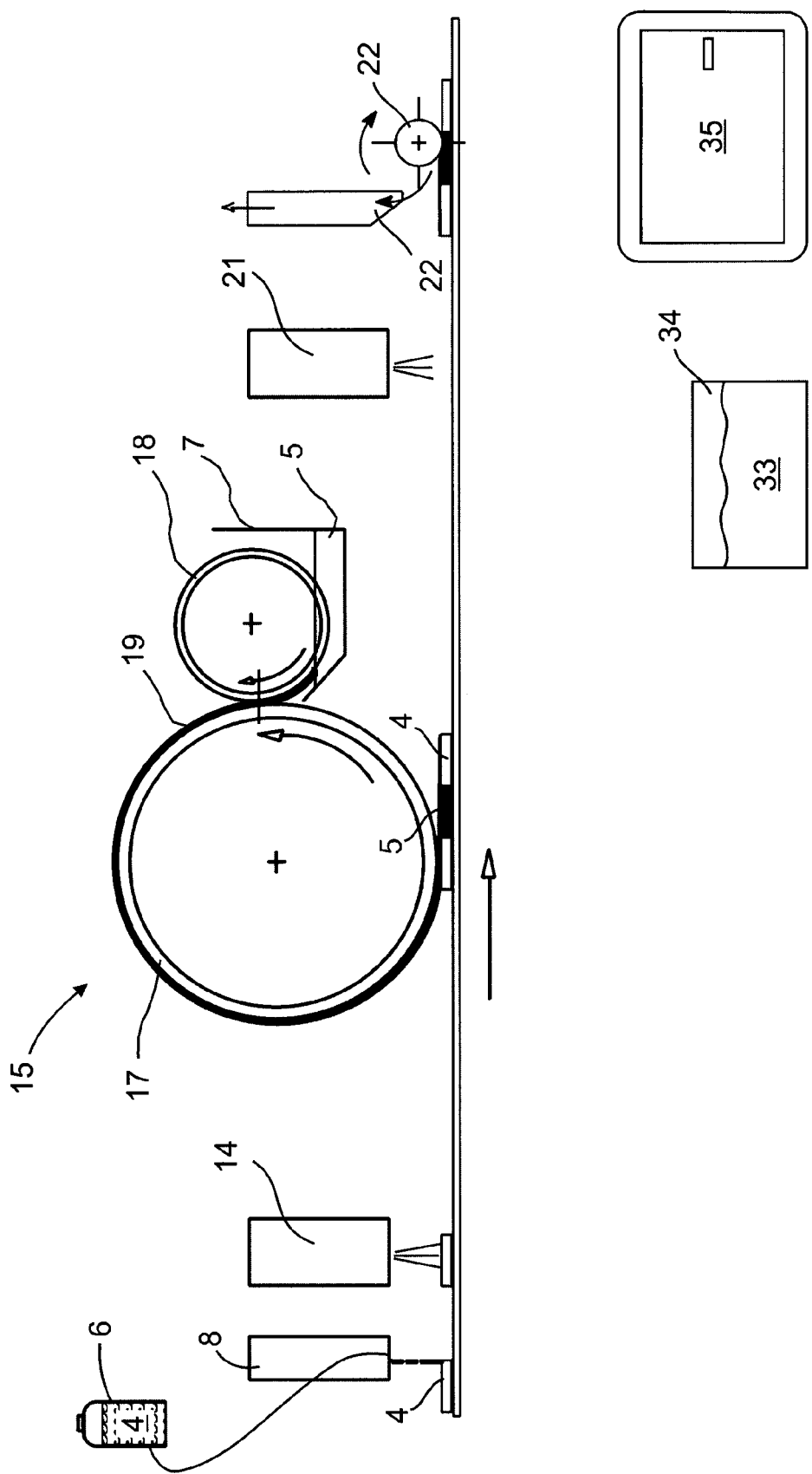

The liquid first material 4 is arranged in a first reservoir 6, and the liquid second material 5 is arranged in a second reservoir 7. Preferably, further material reservoirs can also be used, which contain other materials and further expand possible material mixing. The first reservoir 6 is connected with a first dispensing device 8 for the first material 4 by way of a line. As can be seen in FIG. 2, the first reservoir 6 is configured as an essentially closed container, and the second reservoir 7 is configured as a vat.

The first dispensing device 8 has a first inkjet printing head having a plurality of jets arranged in a row, which are not shown in any detail in the drawing, and are set up for dispensing material portions of the first material 4 onto the base surface 3 or onto a solidified material layer of the first and/or second material 4, 5 situated on this surface. The row of jets is arranged parallel to the plane of the base surface 3 and extends transverse to the circumference direction of the base surface 3, preferably essentially radially towards its center.

The support part 2 and the first dispensing device 8 can be rotated relative to one another using a first positioning device 9, in and opposite to the direction of the arrow 10, and can be displaced parallel to the axis of rotation 11. During this process, points that lie in the base surface 3 and are at a distance from the axis of rotation 11 move along a path curve shaped like a helical line or screw line.

The first dispensing device 8 and the first positioning device 9 are connected with a control device, not shown in any detail in the drawing, which has a data memory for storage of the geometry data of the shaped object 1 to be produced. In the case of selective or partially selective filling with the second material 5, the geometry data are also evaluated and used for activation or deactivation of jets or similar dispensing elements.

Figure 3A:
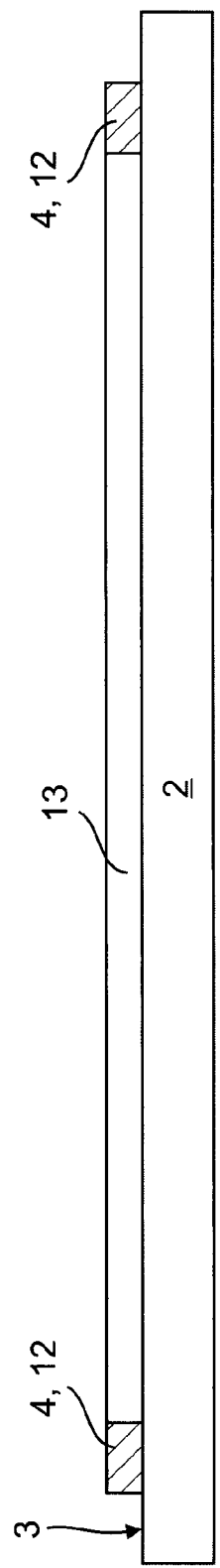

Dispensing of the material portions of the first material 4 as well as the first positioning device 9 can be controlled by means of the control device, as a function of the geometry data, in such a manner that negative-shape layers 12 consisting of the flowable first material 4 can be applied to the base surface 3 or to a solidified material layer of the first and/or second material 4, 5 that was previously applied to this surface (FIG. 3A). In this regard, the negative-shape layers 12 each have at least one cavity 13, which has a negative shape of a material layer of the shaped object 1 to be produced. The cavities 13 extend, in each instance, over the entire layer thickness of the negative-shape layer 12 in question, all the way to the base surface 3 or to the solidified material layer situated under the negative-shape layer 12.

A first solidification device 14 is arranged behind the first dispensing device 8 in the direction of the arrow 10, by means of which device the liquid first material 4 applied to the base surface 3 or to a solidified material layer situated on this surface can be solidified. For this purpose, the first solidification device 14 has a first UV radiation source, not shown in any detail in the drawing, by means of which ultraviolet radiation can be dispensed to the material layer of the first material to be solidified, in such a manner that a photo-cross-linking agent contained in the first material is activated and the polymers contained in the first material 4 are cross-linked.

Figure 3B:
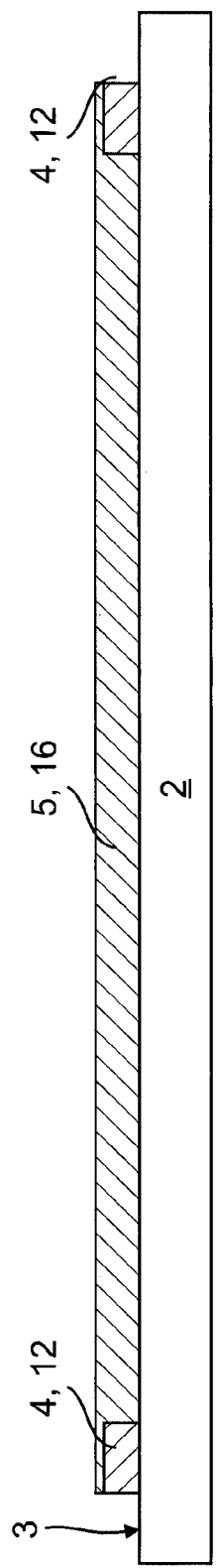

A second dispensing device 15 is arranged behind the first solidification device 14 in the direction of the arrow 10, by means of which device the cavity/cavities 13 of the corresponding negative-shape layer 12 that was previously solidified are filled with the second material 5, so as to form a shaped-object layer 16 (FIG. 3B). In the exemplary embodiment shown in FIG. 2, the second dispensing device 15 is configured as a flexographic printing apparatus.

This apparatus has a transfer body 17 configured as a flexographic printing roll, and a coating device 18 that stands in contact with the second reservoir 7, by means of which device the at least one surface region of the transfer body 17 can be coated with a layer 19 of the second material 5. Using a second positioning device, the conically configured transfer body 17 can be rotated about an imaginary axis of rotation, in such a manner that the layer 19 of the second material 5 situated on the mantle surface of the transfer body 17 comes into contact with the bottom and the inner wall of the cavity/cavities 13, in such a manner that the flowable second material 5 is filled into the cavity/cavities and then forms the shaped-object layer 16. This layer has the positive shape of a layer of the shaped object 1 to be produced, which shape is inverse to the negative shape of the layer 12.

Afterward, the shaped-object layer 16 obtained in this manner is solidified using a second solidification device 21. As can be seen in FIG. 1, the second solidification device 21 is arranged behind the second dispensing device 14 in the direction of the arrow 10. The second solidification device 21 contains a second UV radiation source, by means of which ultraviolet radiation can be dispensed onto the shaped-object layer 15, so as to solidify the second material by means of cross-linking the polymers contained in it, to such an extent that the shaped object 1 to be produced from the shaped-object layers 15 retains its shape.

Figure 3C:
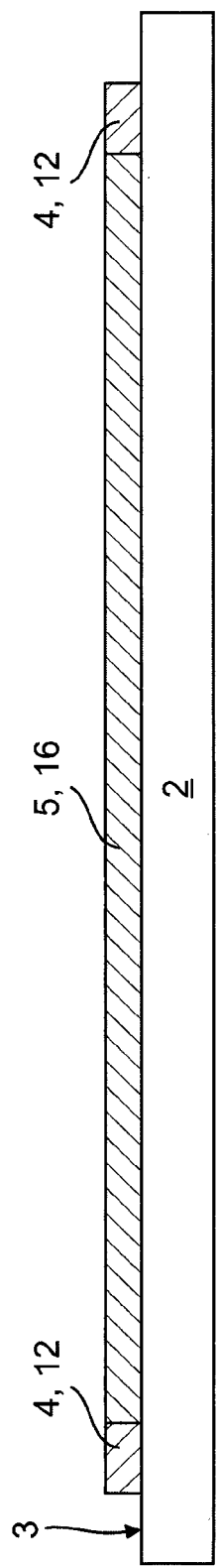
Figure 4:
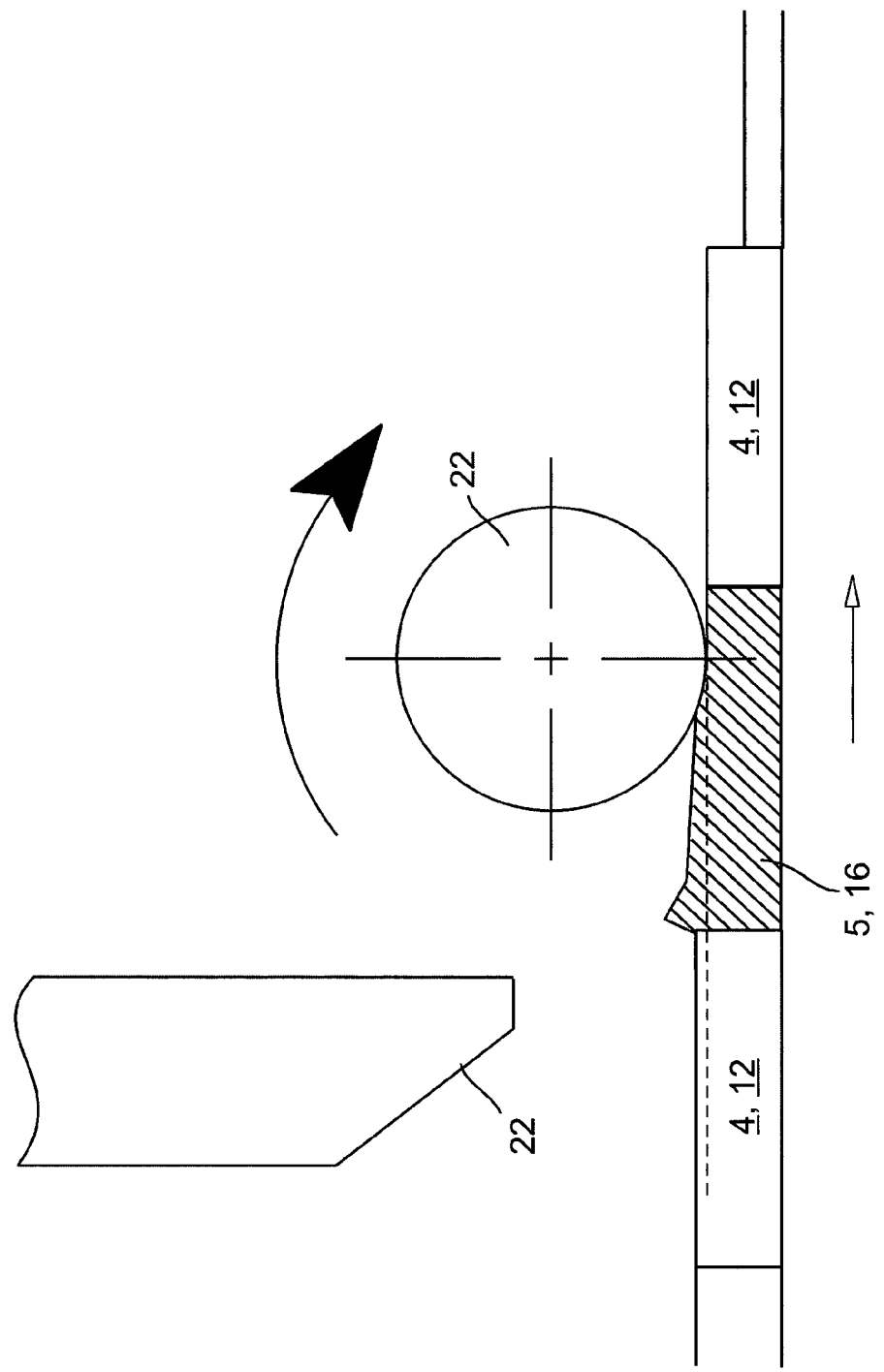
Figure 5:
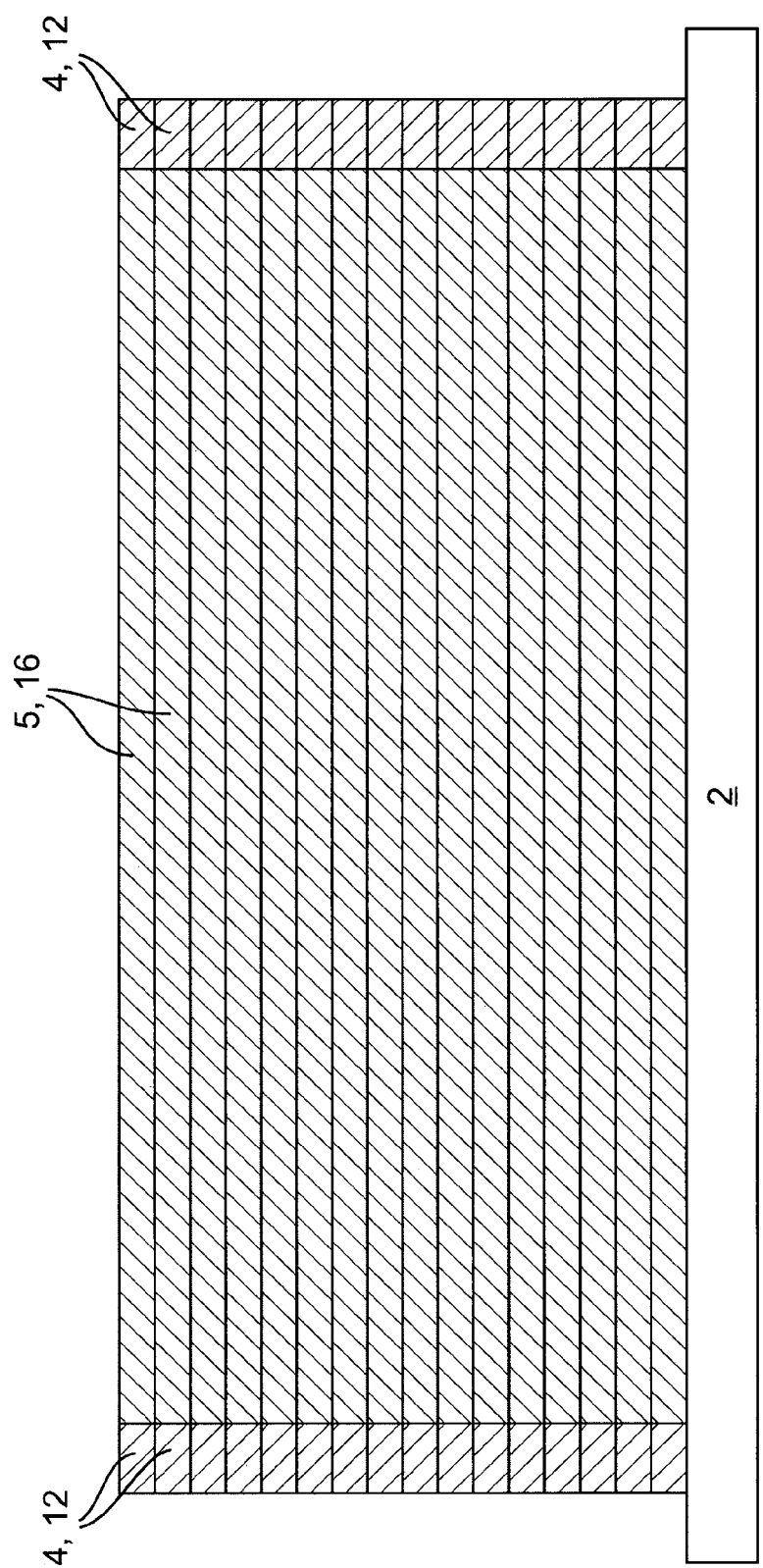
Figure 6:
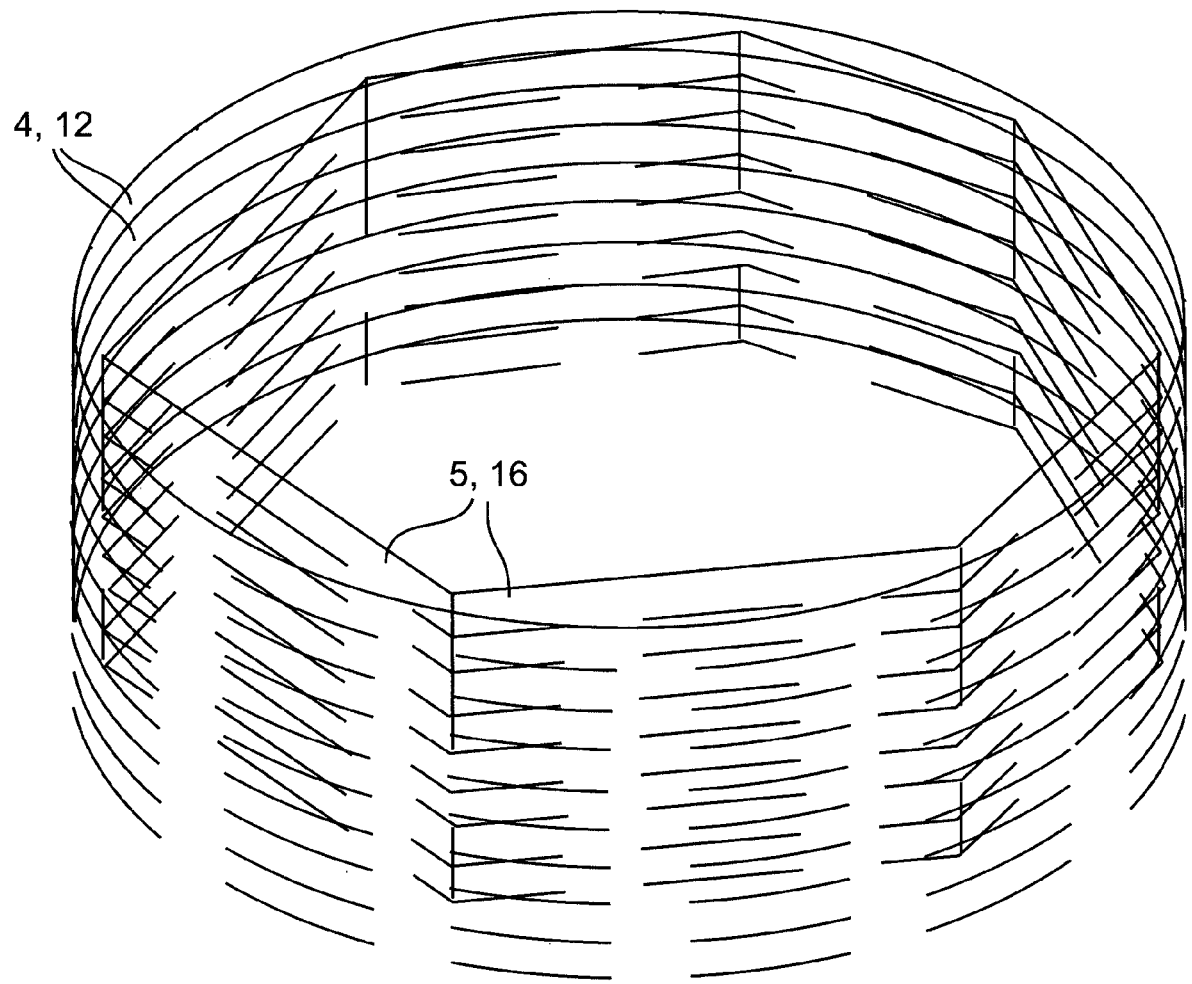
Figure 7:
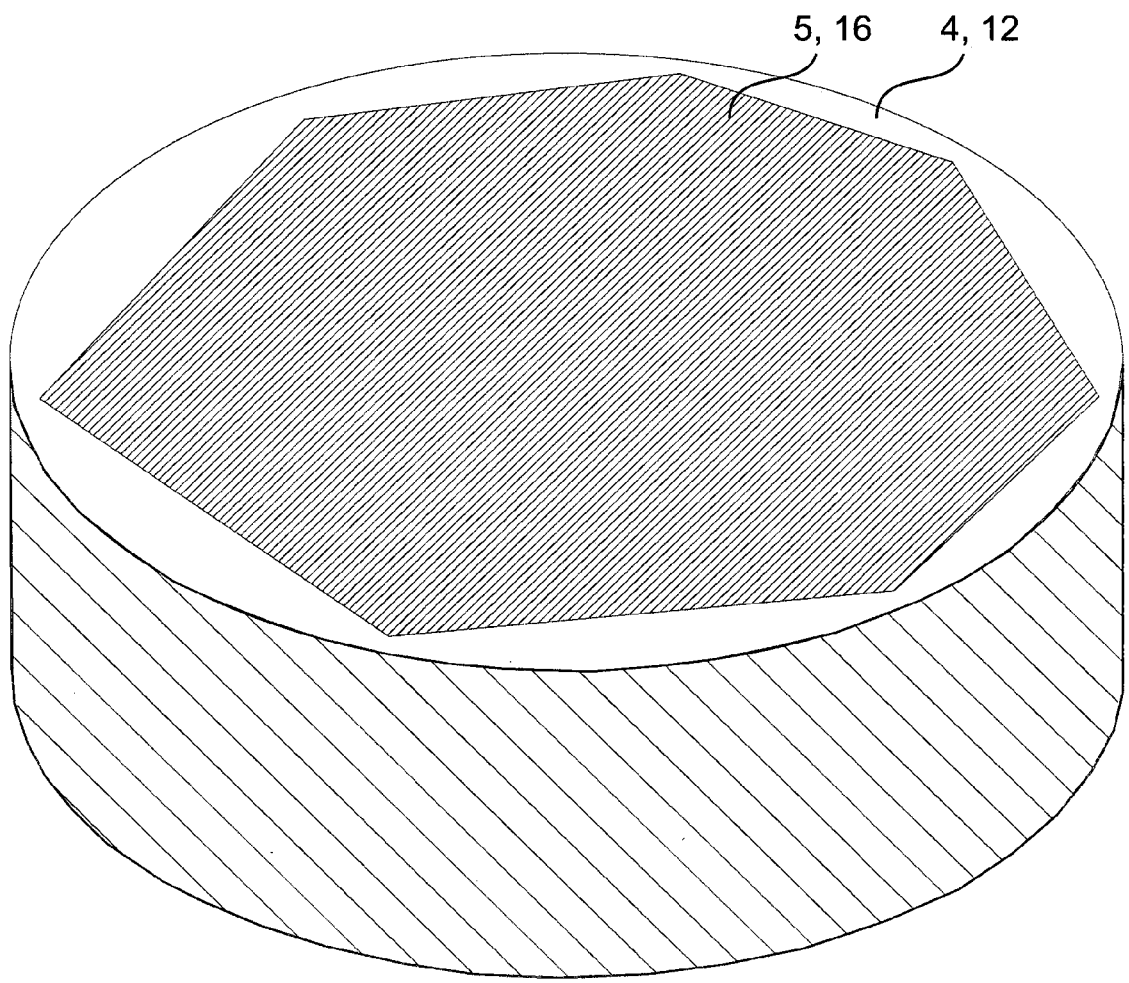
Figure 8:
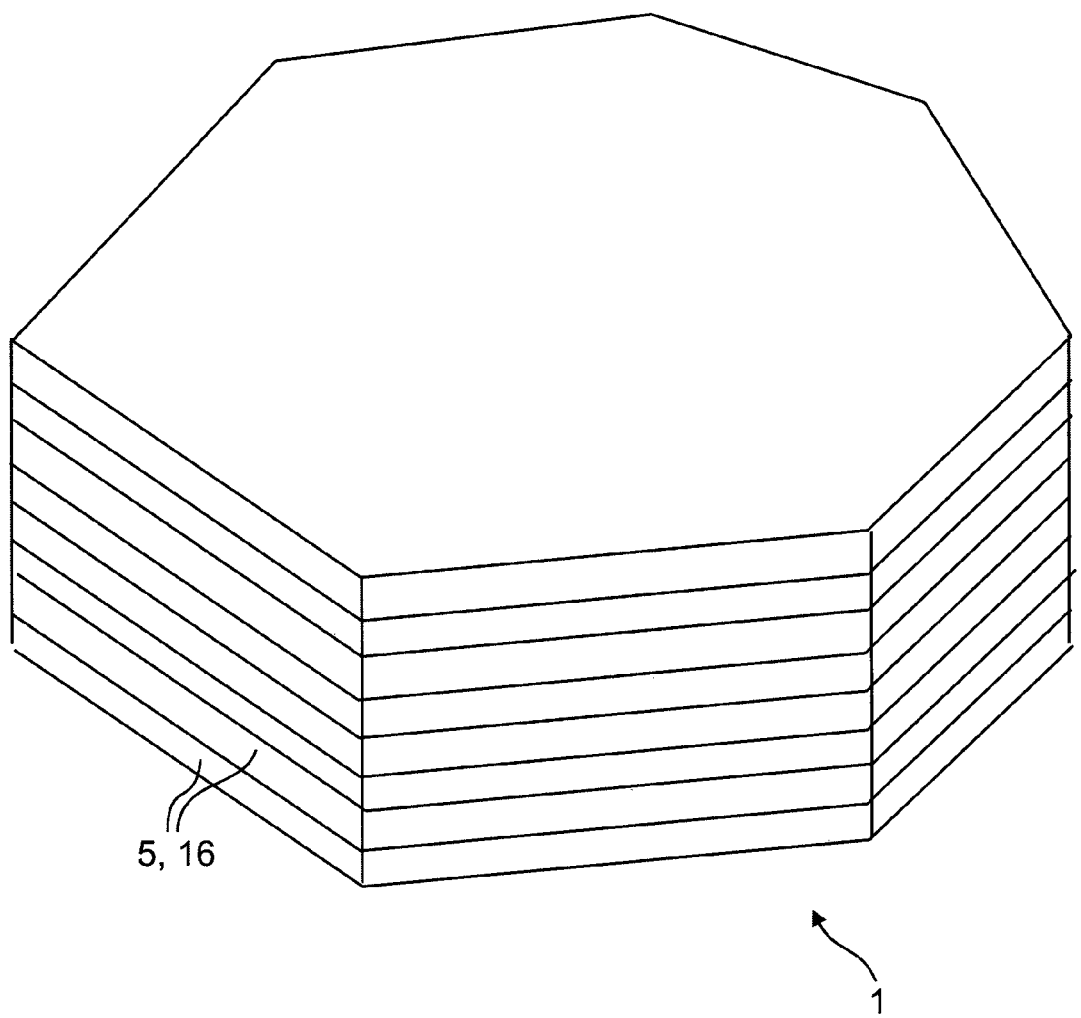

Afterward, in a further method step, regions of the solidified negative-shape layer 12 and/or of the solidified shaped-object layer 16 and/or of the solidified second material 5 that is arranged on the negative-shape layer are removed by means of a thickness milling tool 22 (FIG. 3C, 4). During this process, regions of the solidified first and/or second material 4, 5 that project beyond a plane arranged at a predetermined distance from the base surface 3, parallel to it, are removed by means of material removal, and subsequently vacuumed away by means of a suction nozzle 23. If necessary, a surface cleaning device 20 can be arranged behind the suction nozzle 23.

Now, in a corresponding manner, a further negative-shape layer 12 (FIG. 3D) and a further shaped-object layer 16 are applied to the surface of the solidified negative-shape layer 12 and the shaped-object layer 16 (FIG. 3E, 3F). These steps are repeated until all the shaped-object layers 16 of the shaped object to be produced have been produced (FIG. 5 to 8).

In a further method step, the negative-shape layers 12 are brought into contact with the solvent 33 in such a manner that the solidified first material 4 completely dissolves in the solvent 33. This result can be achieved, for example, in that the layer stack consisting of the negative-shape layers 12 and the shaped-object layers 16 is immersed in the solvent 33, which is situated in a container 34, for a predetermined period of time. Afterward, the finished shaped object (FIG. 8) is removed from the solvent 33 and dried.

After removal of the negative shape, heat treatment is carried out, during which the shaped object 1, consisting of the shaped-object layers 16 that are layered one on top of the other, is heated, step by step, to a temperature adapted to the second material 5, at which temperature the hardener contained in the second material 5 triggers chemical cross-linking of the main component of the second material 5. To carry out the heat treatment, it is practical if the shaped object 1 is placed in an oven 35 and kept at a predetermined temperature there, for example 130° C., for a predetermined period of time, which can amount to 15 to 90 minutes. The times and the temperatures can vary as a function of the material mixture used.

In this process, the main component is cross-linked with final effect and solidified with relaxation, so that the second material 5 has a greater strength than the solidified first material 4 had before it was brought into contact with the solvent 33. Final cross-linking takes place slowly, and thereby mechanical stresses in the main component are prevented or reduced.

Figure 9:
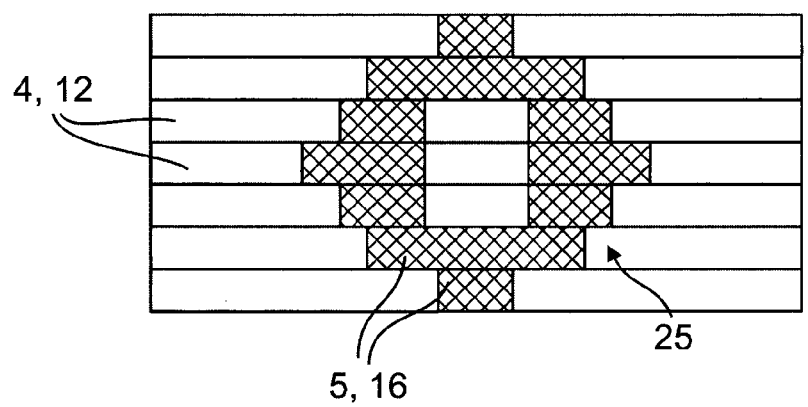
Figure 10:
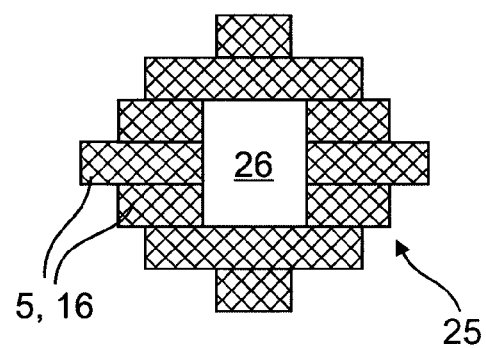

As can be seen in FIGS. 9 and 10, it is also possible to produce shaped objects having overhangs 25 and cavities 26, using the method according to the invention.

Figure 11:
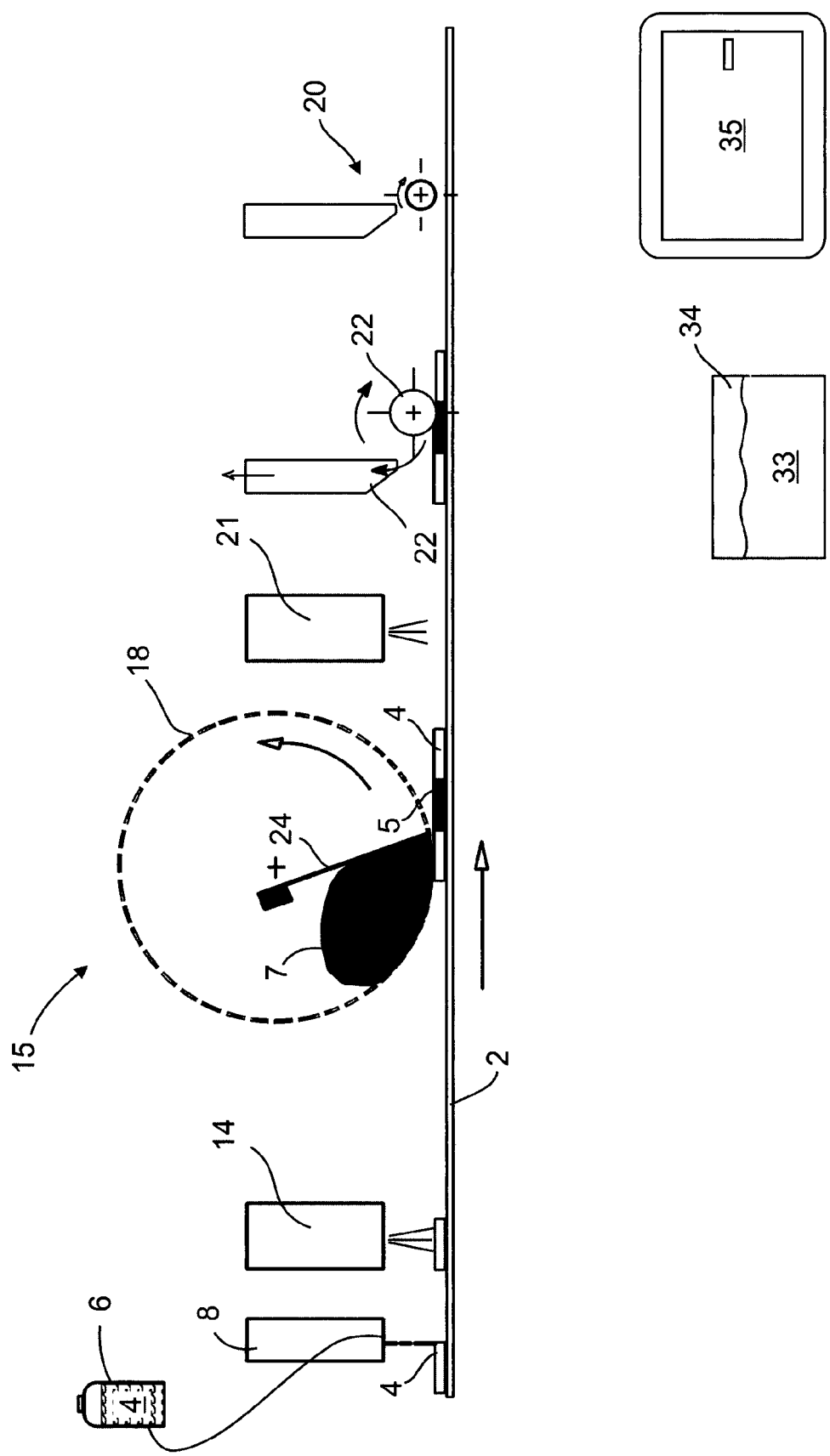

The second material 5 can also be filled into the cavity/cavities 13 using a screen-printing method. As can be seen in FIG. 11, in this process the transfer body 18 is configured as a rotation screen-printing roll. This roll has a perforated, screen-like mantle surface. The second reservoir 6 is arranged in the inner cavity of the rotation screen-printing roll.

The perforated holes provided in the mantle surface are coordinated with the viscosity of the second material 5, with regard to their dimensions, in such a manner that the second material 5 can be pressed through the perforated holes by means of a doctor blade 24 that lies against the inner mantle surface of the cylinder wall of the rotation screen-printing roll in line shape. Outside of the region of effect of the doctor blade 24, the second material 5 does not pass through the perforated holes. A cleaning apparatus placed behind the dispensing location removes the material not taken off from the rotation screen-printing roll, and passes it back into the circuit for re-use. For the remainder, the apparatus shown in FIG. 11 corresponds to that shown in FIG. 2, so the description of FIG. 2 applies analogously to FIG. 11.

Figure 12:
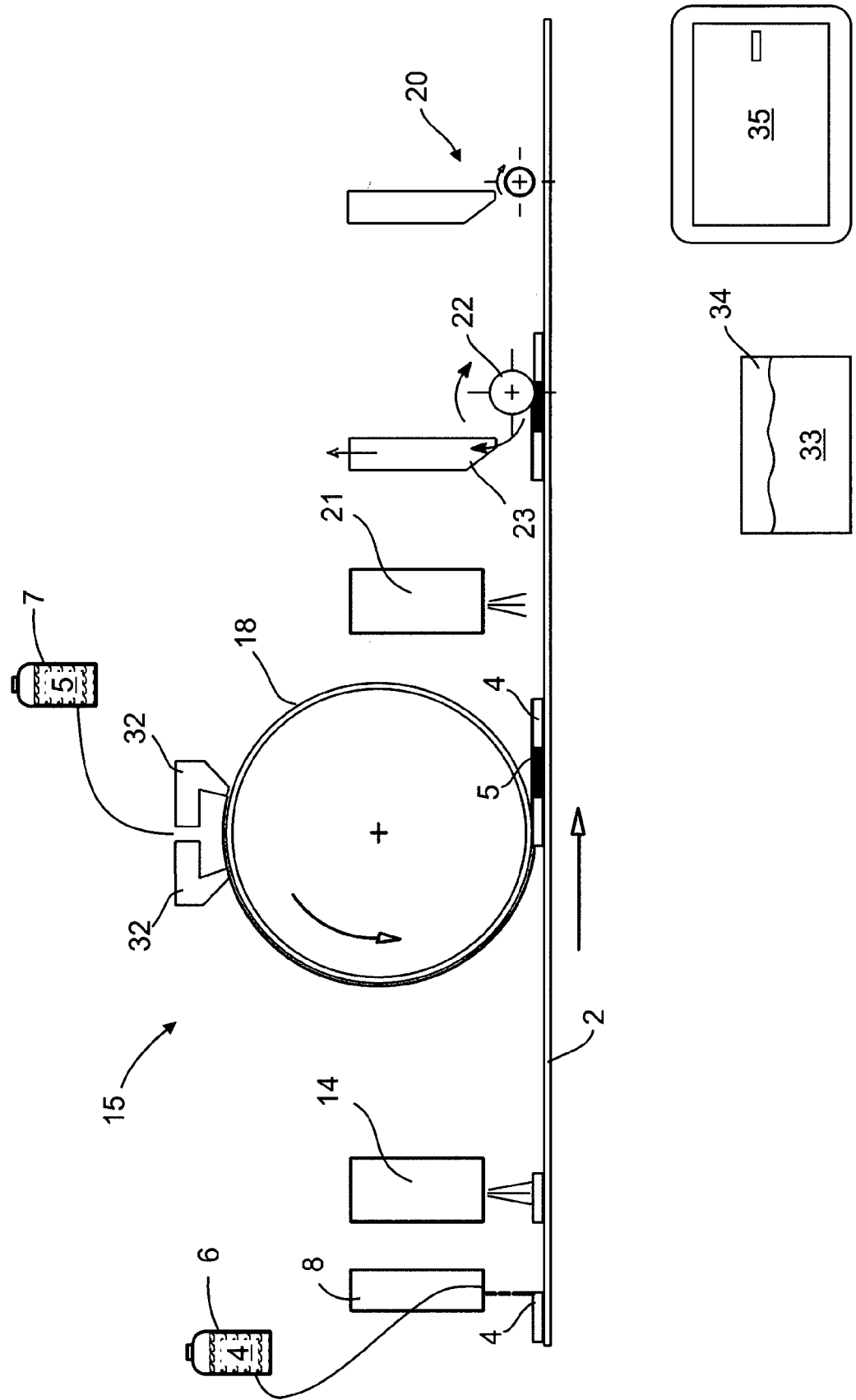

The second material 5 can also be filled into the cavity/cavities 13 using the chamber doctor blade method. As can be seen in FIG. 12, in this regard the transfer body 18 is structured as a raster roll, on the outer mantle surface of which a chamber doctor blade 32 is arranged. The raster roll has a correspondingly engraved mantle surface, prepared to hold the material. For the remainder, the apparatus shown in FIG. 12 corresponds to that shown in FIG. 2, so that the description of FIG. 2 applies analogously to FIG. 12.

Figure 13:
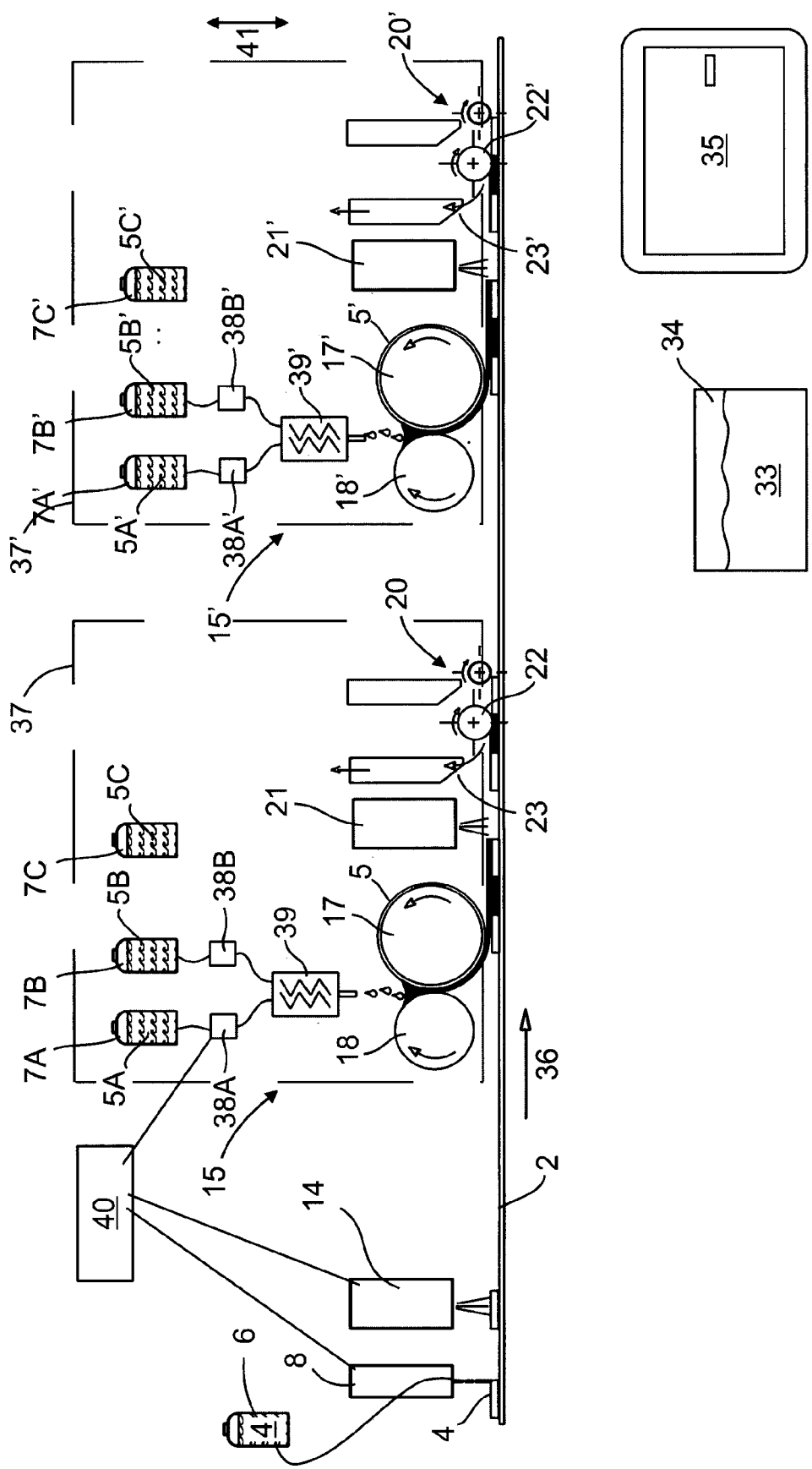

In the case of the exemplary embodiment shown in FIG. 13, the arrangement consisting of the first reservoir 6, the first dispensing device 8, and the first solidification device 14 corresponds to that shown in FIG. 2, in other words the first material 4 is applied using an inkjet printing head. Multiple printer modules 37, 37' are assigned to the first dispensing device, which modules are arranged ahead of the dispensing device 8 in the transport direction 36 of the support part 2, in other words the individual regions of the base surface 3 or of the solidified material layer situated on this surface, which regions are to be coated, are moved past the first dispensing device 8 first, in each instance, and afterward moved past the printer modules 37, 37'. Each printer module 37, 37' has a second dispensing device 15, 15', in each instance, which device comprises a transfer body 17, 17' structured as a flexographic printing roll and a coating device 18, 18' for this purpose. The structure of the second dispensing devices 15, 15' corresponds to those from FIG. 2 to this extent.

Each of the second dispensing devices 15 or 15' has multiple second reservoirs 7A, 7B, 7C or 7A', 7B', 7C', respectively, assigned to it, in which different material components 4A, 4B, 4C or 4A', 4B', 4C', respectively, are kept on hand, from which the corresponding second material 5, 5' can be produced by means of mixing. The second reservoirs 7A, 7B, 7C or 7A', 7B', 7C', respectively, of each second dispensing device 15 or 15', respectively, are connected with inlet openings of a mixer 39, 39' by way of a metering device 38A, 38B, 38A', 38B', in each instance. The outlet opening of the mixer 39, 39' is connected with the second dispensing device 15, 15' assigned to it. Control inputs of the metering device 38A, 38B, 38A', 38B' are connected with a controller 40 by way of control lines. Metering of the individual material components 4A, 4B, 4C or 4A', 4B', 4C', respectively, can be changed in program-controlled manner during the production process of the shaped object, as a function of the location-dependent material data stored in the data memory, so as to adjust the mixture ratio of the material components 4A, 4B, 4C or 4A', 4B', 4C', respectively, in accordance with the material properties of the second material 5, 5' that are desired, in each instance. In this way, it is possible, in particular, to increase (or reduce) the strength of the material layers produced from the second material 5, in a graduated manner, from one material layer to the next material layer, over multiple material layers, from a first strength value to a second strength value, so as to prevent large jumps in strength in the material of the shaped object.

As can be seen in FIG. 13, each printer module 37, 37' furthermore has a second solidification device 21, 21' assigned to it, a thickness milling tool 22, 22', and a surface cleaning device 20, 20'. With regard to these components, the description of FIG. 11 applies analogously to FIG. 13.

It should still be mentioned that the printer modules 37, 37' can be positioned transverse to the base surface 3, relative to it, in the direction of the double arrow 41.

Figure 14:
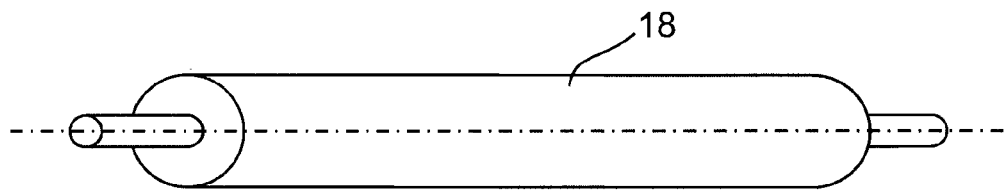
Figure 15:
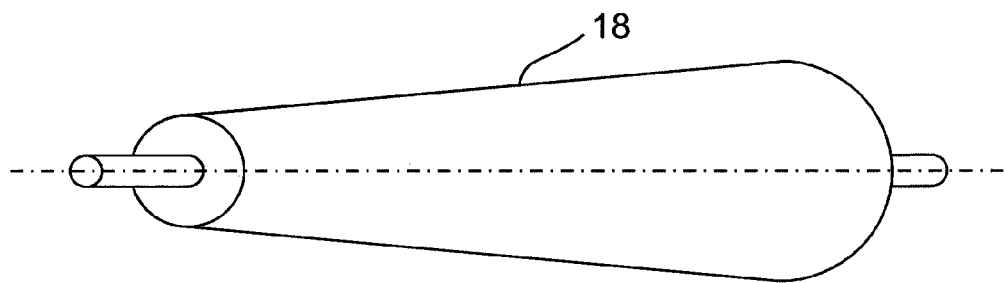

While the roll of the coating device 18 has a cylindrical shape in the case of the Cartesian method (FIG. 14), in the case of the polar method the roll has a conical shape (FIG. 15).

Figure 16:
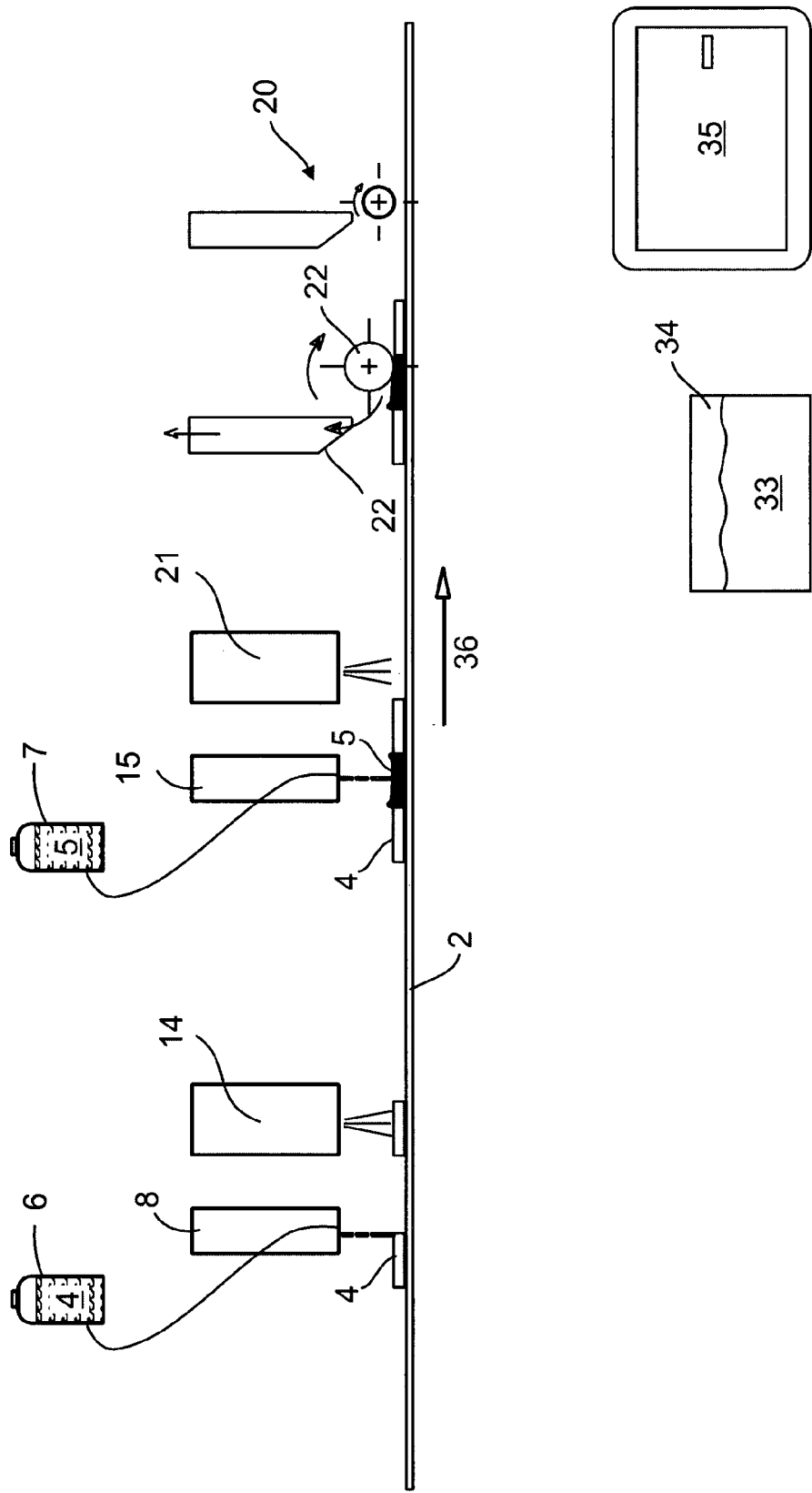

The second material 5 can also be filled into the cavity/cavities 13 using the inkjet printing method (FIG. 16). For this purpose, the second dispensing device 15 has a second inkjet printing head having a plurality of jets arranged in a row, which are set up for dispensing material portions of the second material 5 onto the base surface 3 or onto a solidified material layer of the first and/or second material 4, 5 situated on this surface. The row of jets is arranged parallel to the plane of the base surface 4 and extends transverse to the circumference direction of the base surface 3, preferably essentially radially towards its center. Since the second material 5 has a greater viscosity than the first material 4, the jets of the second inkjet printing head have a greater cross-section than those of the first inkjet printing head. Instead of working with a greater jet cross-section or in addition to that, it is also possible to work with a higher jet pressure than that of the first jets in the case of the jets of the second inkjet printing head. Positioning of the support part 2 relative to the inkjet printing head takes place in accordance with FIG. 1, using a positioning device. Ejection of the second material 5 is controlled as a function of the relative position between the inkjet printing head and the support part 2 and as a function of the geometry data made available for the shaped object 1 to be produced.

Figure 17:
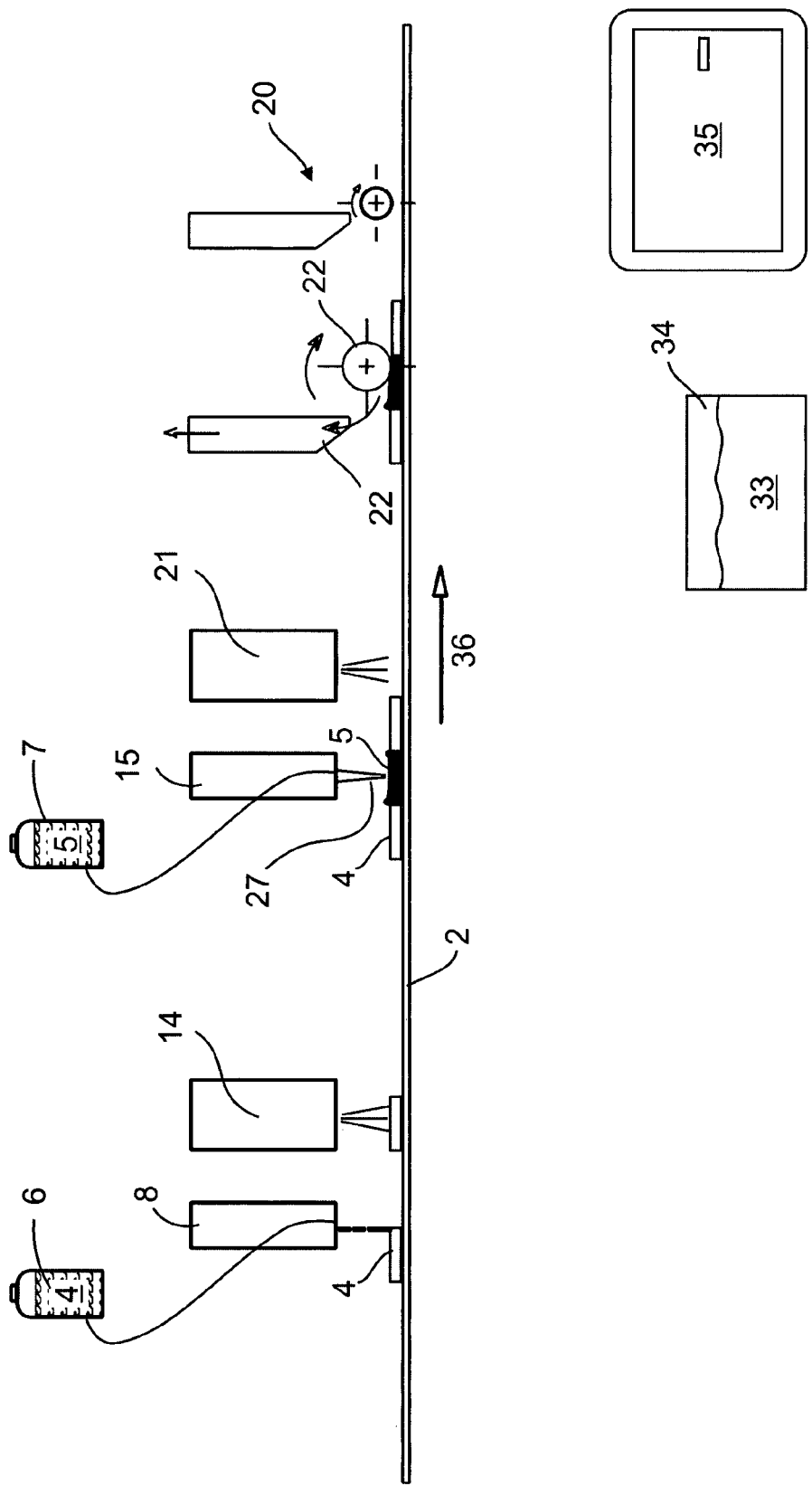
Figure 18:
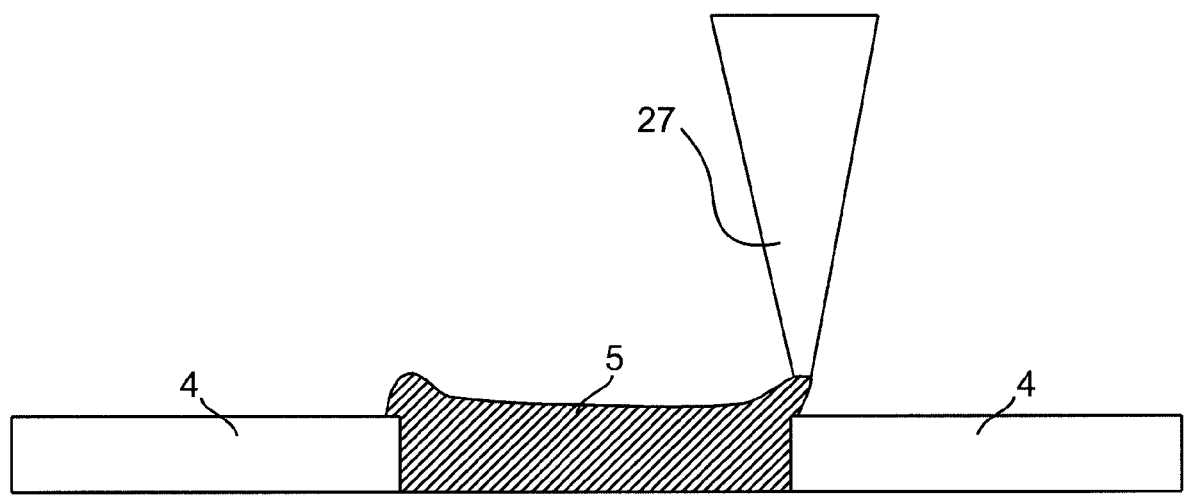

In the case of the exemplary embodiment shown in FIG. 17, the second material 5 is filled into the cavity/cavities 13 using the jet method. In the case of the jet method, a high-viscosity second material 5 is conveyed through a jet exit at room temperature, by means of gas pressure. Positioning of the support part 2 relative to the jet 27 (FIG. 18) takes place in accordance with FIG. 1, using a positioning device 9. Ejecting the second material 5 from the jet 27 is controlled as a function of the relative position between the jet 27 and the support part 2 and as a function of the geometry data made available for the shaped object 1 to be produced. After the second material has been filled into the cavity/cavities 13, it is solidified by means of cooling.

Figure 19:
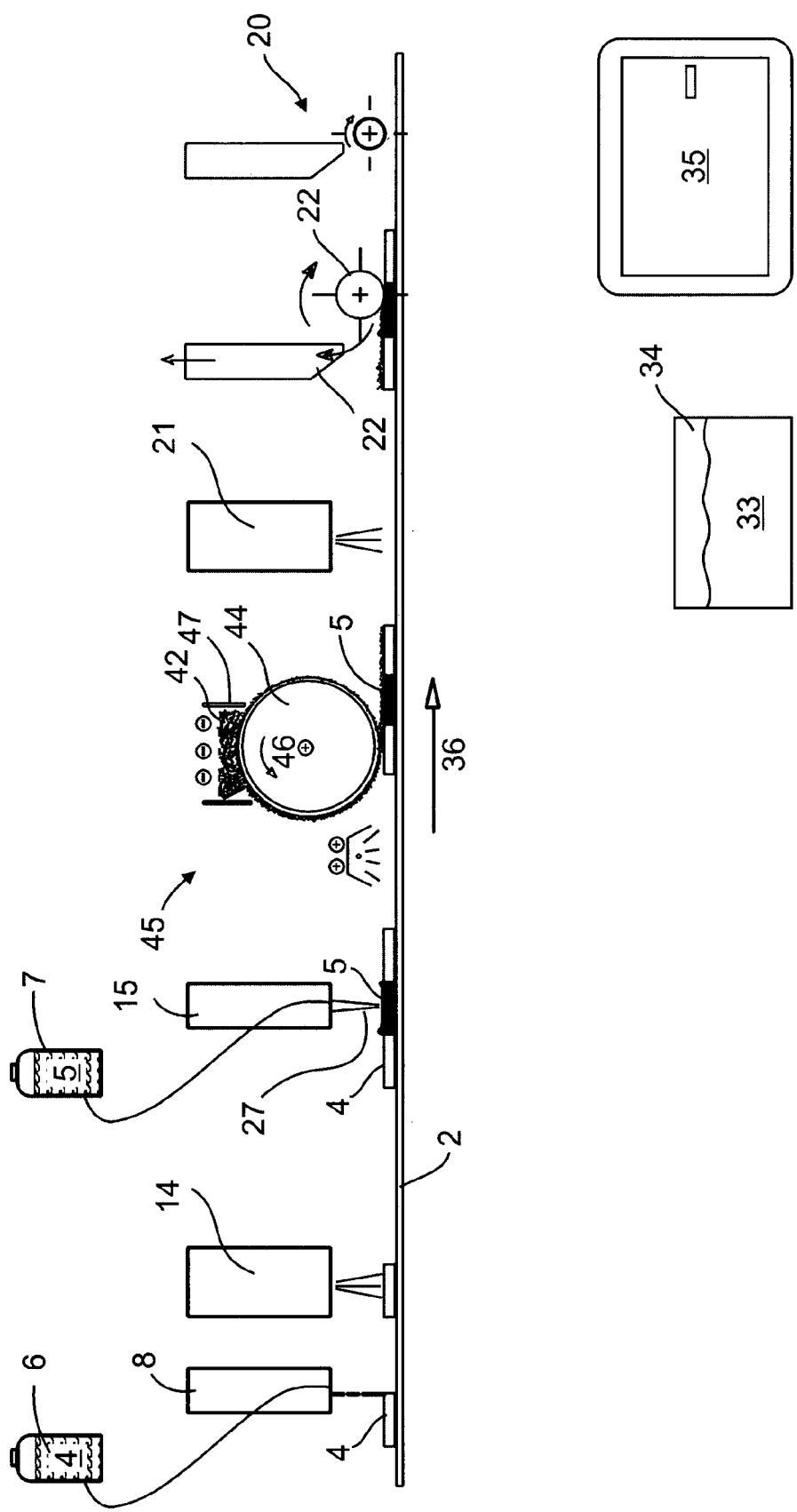

In the case of the exemplary embodiment shown in FIG. 19, the second material 5 filled into the cavity 13 is brought into contact with fiber-form solid particles 42 before its main component is partially cross-linked, in such a manner that these particles penetrate into the second material 5 situated in the cavity 13. For this purpose, the apparatus has a device 45 for applying the solid particles 42, which device is arranged between the second dispensing device 15 and the second solidification device 21. The solid particles 42 are arranged in a supply container 43, which is delimited, on its underside, by the mantle surface of a transfer roll 44. The transfer roll 44 is driven to rotate, in the direction of the arrow 46, about an axis of rotation arranged parallel to the base surface 3 of the support part 2 and at a right angle to the transport direction 36 of this part. A gap is arranged between the side walls 47 of the supply container 43 and the mantle surface of the transfer roller 44, through which gap the solid particles 42 pass. As the mantle surface of the transfer roll 44 moves past the solid particles 42 contained in the supply container 43, these are applied to the mantle surface of the transfer roll 44 as a solid-particle layer 48.

Figure 20:
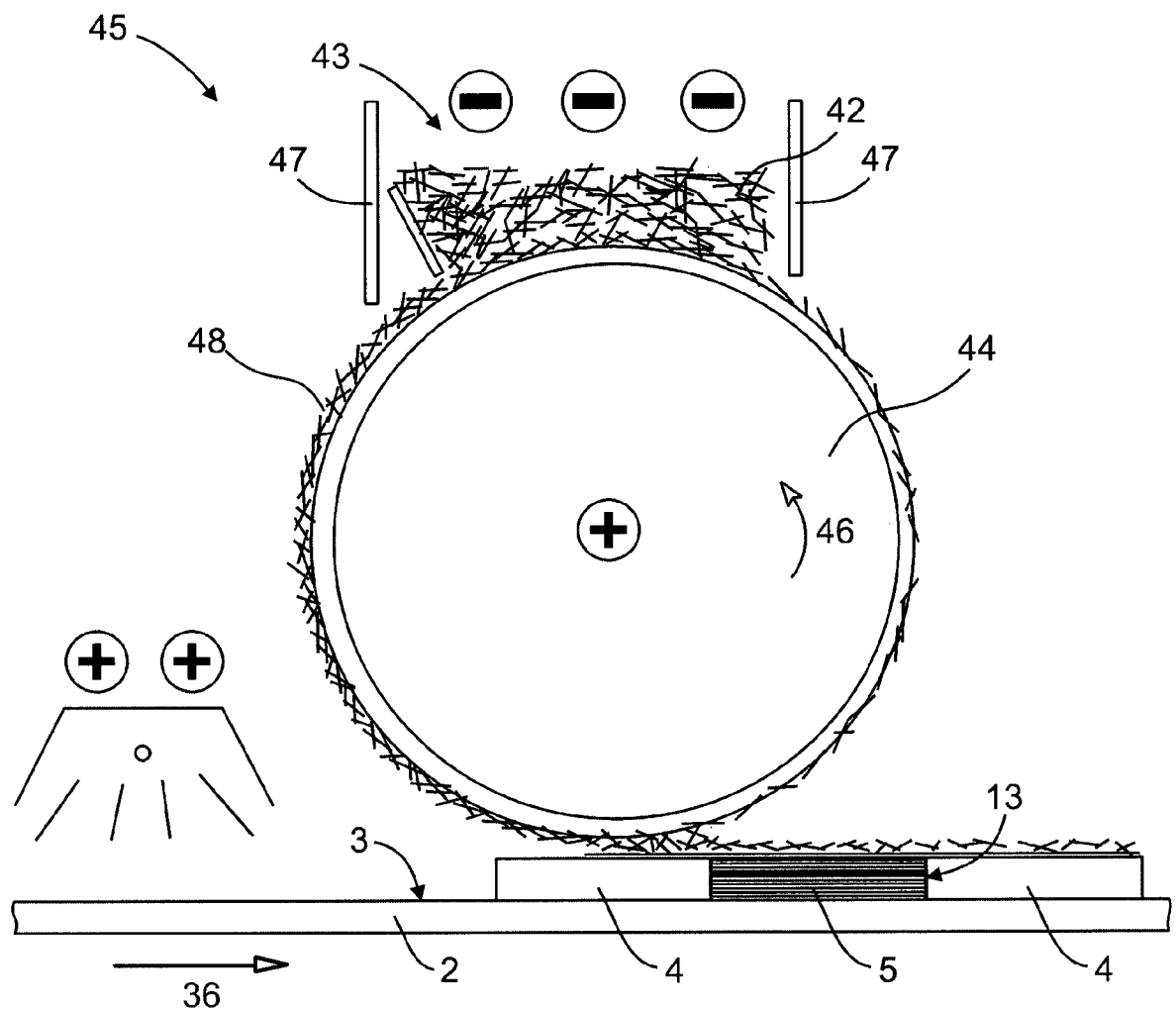

As can be seen in FIG. 20, the transfer roll 44 is positioned, with its mantle surface, so close to the surface of the flowable second material 5 that has been filled into the cavity 13 that the solid-particle layer 48 comes into contact with the second material 5, but the transfer roll 44 does not. The transfer roll 44 consists, at least on its mantle surface, of an electrically conductive material to which a positive potential is applied. The solid particles 42 are negatively charged. In addition, the base surface or the surface of the second material that faces the surface of the transfer roll 44 is positively charged electrostatically, so that it attracts the solid particles 42 when these get into the electrical field of the electrostatic charges.

Figure 21:
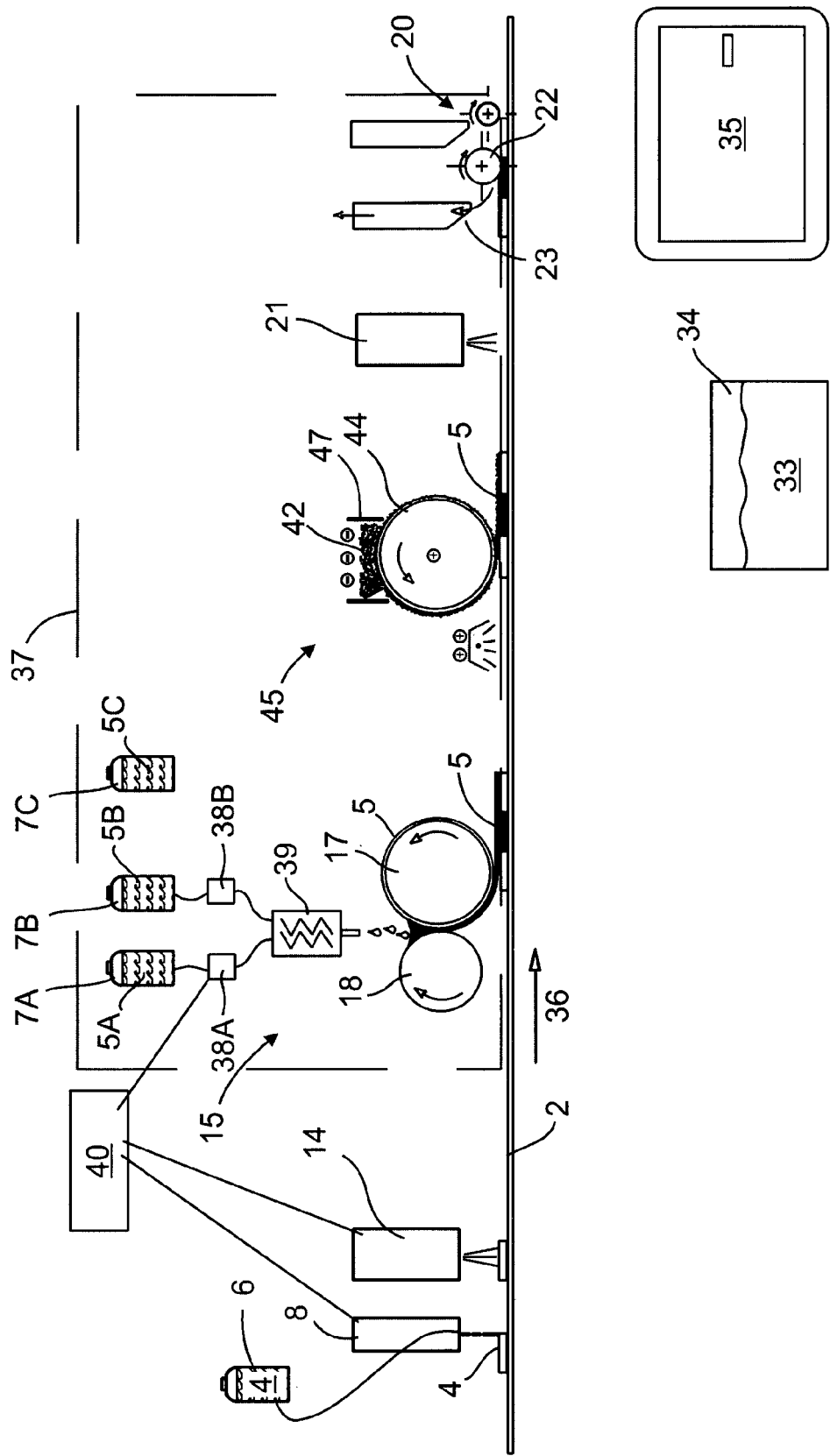

The exemplary embodiment shown in FIG. 21 differs from the exemplary embodiment shown in FIG. 19 in that instead of the second dispensing device 15 that has the jet 27, a dispensing device 15 having a transfer body 17 structured as a flexographic printing roll is provided. The structure of this dispensing device 15 corresponds to that of the second dispensing device 15 from FIG. 13, in other words the second material 5 is produced by mixing multiple material components 4A, 4B, 4C together during the printing process. The exemplary embodiment shown in FIG. 21 has only one printer module 37. However, other embodiments are also conceivable, in which multiple printer modules 37 that each have a device for applying solid particles 42 can be arranged one behind the other. The same holds true analogously for the apparatus shown in FIG. 19.

Figure 22:
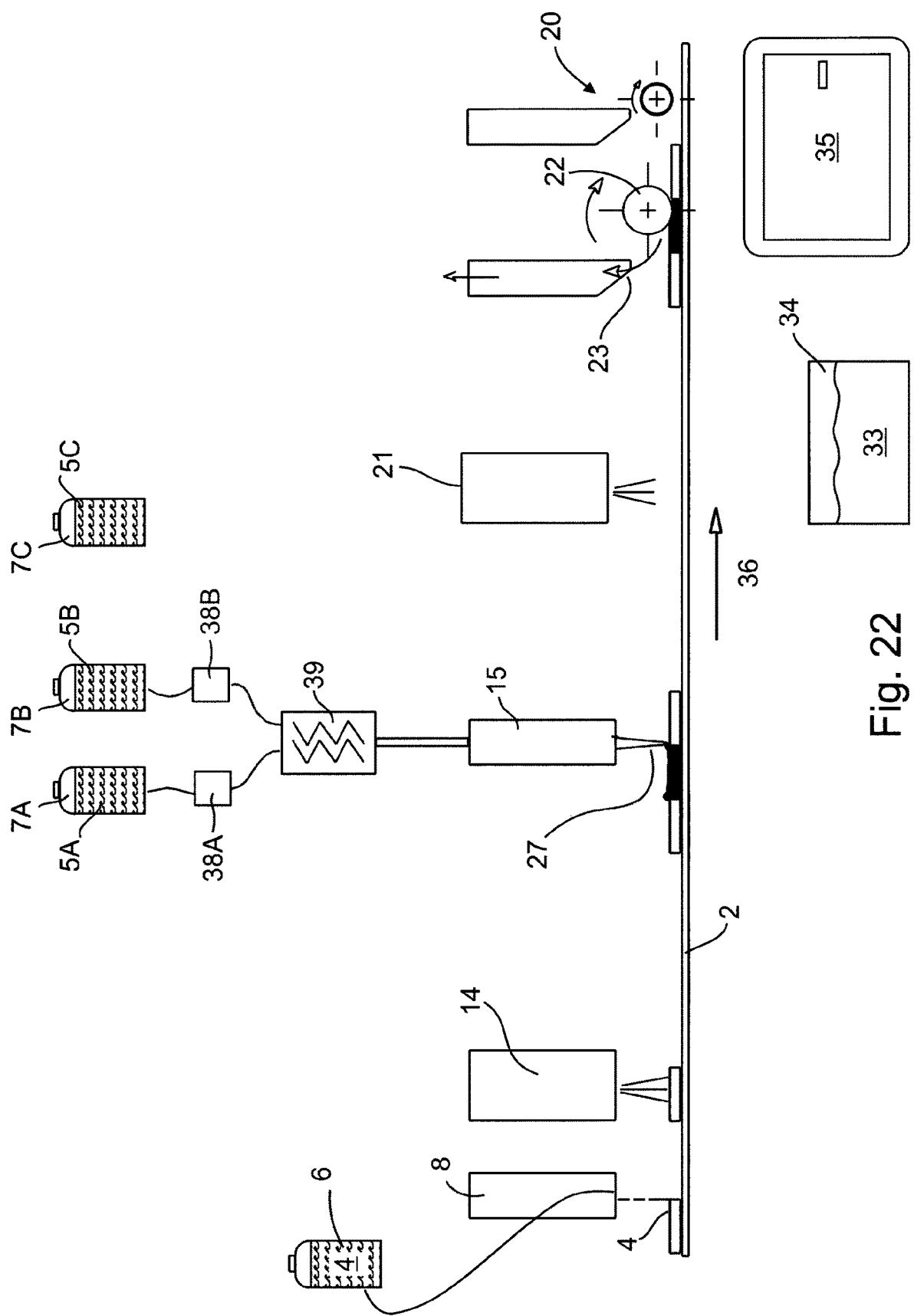

As can be seen in FIG. 22, the coating device 15 can also be connected, by way of a mixer 39, with multiple second reservoirs 7A, 7B, 7C or 7A', 7B', 7C', respectively, in which different material components 4A, 4B, 4C are kept on hand. The second reservoirs 7A, 7B, 7C are each connected with the inlet openings of the mixer 39, 39' by way of a metering device 38A, 38B assigned to them. The outlet opening of the mixer 39, 39' is connected with the second dispensing device 15. Control inputs of the metering device 38A, 38B are connected with the controller 40 by way of control lines. Metering of the individual material components 4A, 4B, 4C can be changed in program-controlled manner during the production process of the shaped object 1, as a function of the location-dependent material data stored in the data memory.

Figure 23:
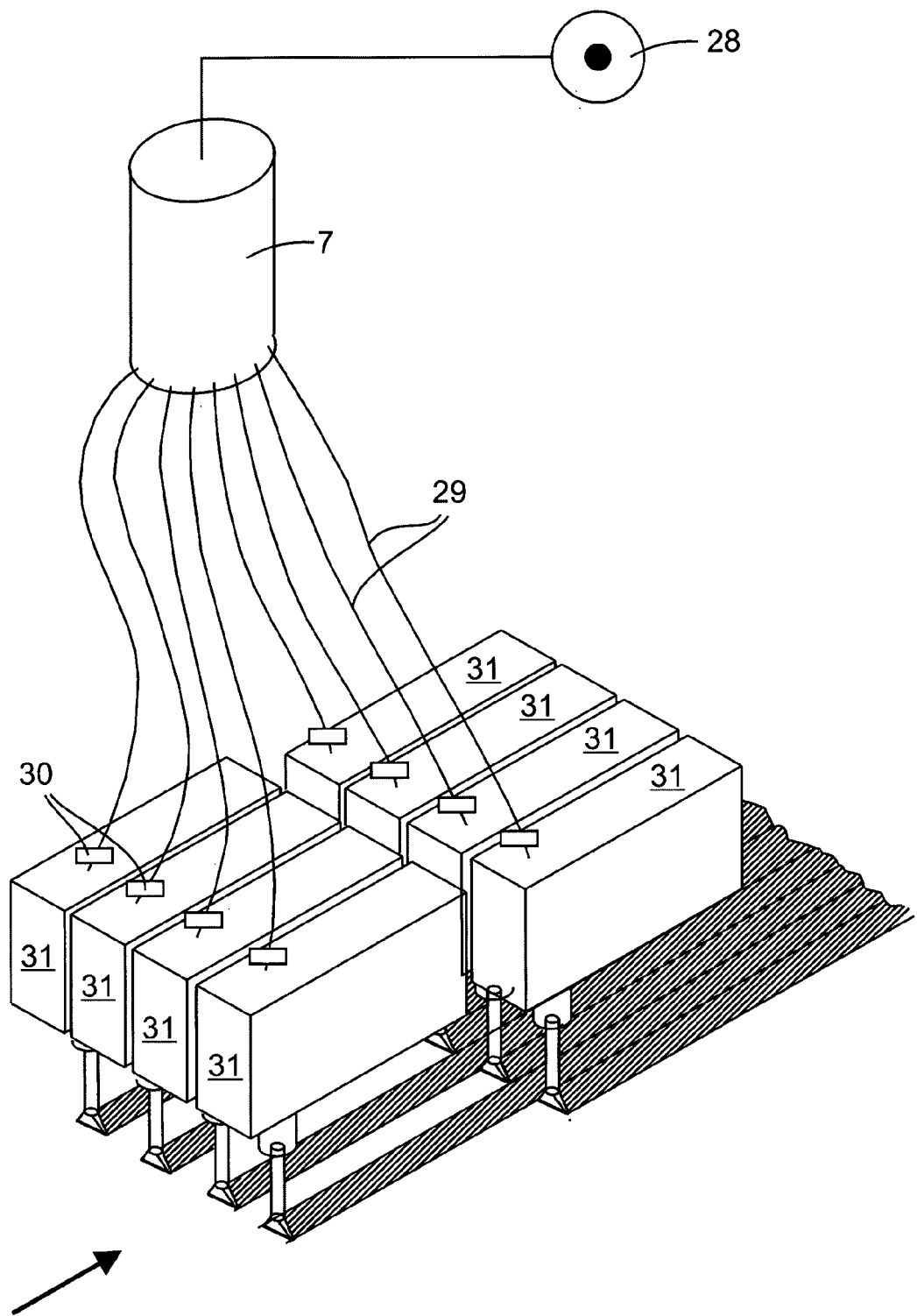

The second material 5 can also be filled into the cavity/cavities 13 by means of a micro-metering method. As can be seen in FIG. 23, in this regard the second reservoir 7 is connected with a gas pressure source 28, which can be a compressed-air source, for example, so as to put pressure on the second material 5. The reservoir 7 is connected with a jet 27 for dispensing material, by way of lines 29 in which a valve 30 that can be adjusted between an open position and a closed position, in each instance, is arranged. The exit opening of the jet 27 is arranged with its exit opening at a slight distance from the base surface 3 and then positioned in such a manner along the base surface 3, relative to the support part 2. The individual valves 30 are controlled, in each instance, as a function of the geometry data made available for the shaped object 1 to be produced, and as a function of the relative position between the jet 27 and the support part 2, in such a manner that the material flow of the second material 5 is released when the exit opening of the jet 27 is positioned at the cavity 13. The material flow is blocked when the exit opening of the jet 27 is not positioned at the cavity 13.

Figure 24:
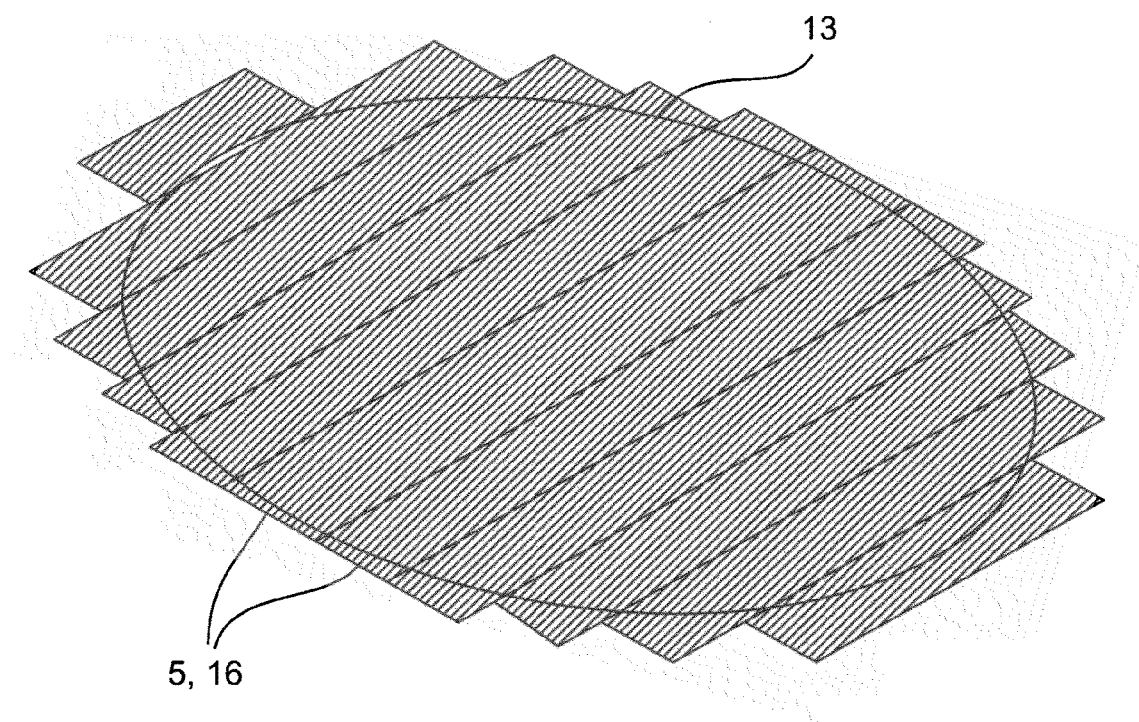
Figure 25:
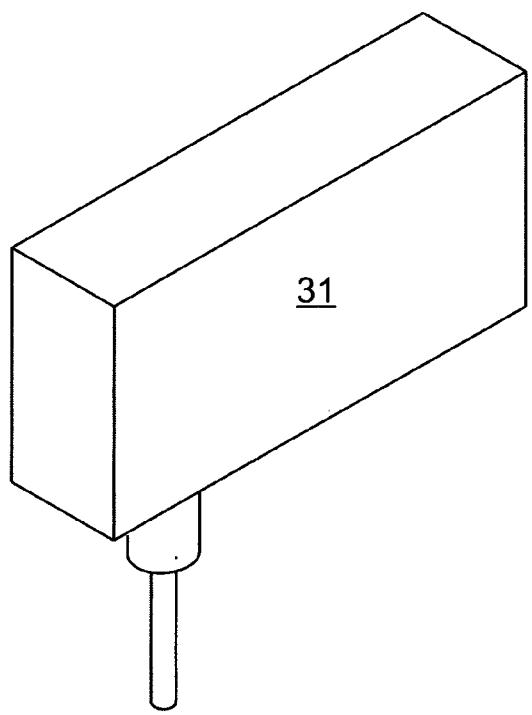
Figure 26:
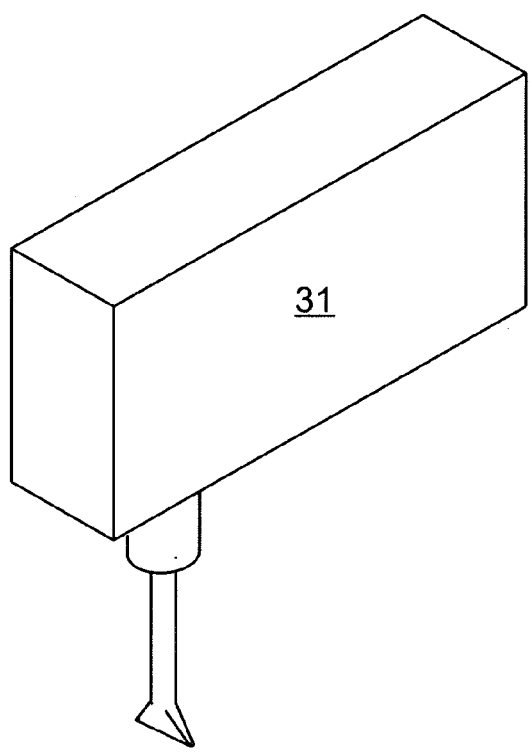

As can be seen in FIG. 23, multiple micro-metering units 31 can be provided, the valve 30 of which is connected with the second reservoir 7 with its inlet, in each instance, by way of a line 29. Each micro-metering unit 31 has a jet 27, in each instance, which is connected with the outlet of the valve 30 in question. The jets 27 are arranged in matrix shape, in multiple rows and/or multiple columns. The valves 30 are controlled in such a manner that the second material 5 is applied to the cavity 13 in planar manner (FIG. 24). The jet 27 can have a round (FIG. 25) or a polygonal, preferably a rectangular (FIG. 26) exit opening.

The invention claimed is:

1. A method for producing a three-dimensional shaped object by means of layer-by-layer material application, comprising:

a) providing geometry data for the shaped object, a support part having a base surface for holding the shaped object, a liquid or flowable first material that can be solidified, and a liquid, flowable, paste-like, or powder-form second material that can be solidified, wherein the second material comprises at least one main component that can be cross-linked by means of treatment with energy, and a latent hardener that can be thermally activated to trigger chemical cross-linking of the main component as the result of an action of heat, b) applying material portions of the first material to the base surface, in accordance with the geometry data, to form a negative-shape layer in such a manner that the negative-shape layer has at least one cavity on a surface facing away from the base surface, wherein the at least one cavity has a negative shape of a material layer of the shaped object to be produced, c) solidifying the negative-shape layer, d) forming a shaped-object layer by filling the at least one cavity with the second material, such that the negative shape is transferred to the shaped-object layer as a positive shape, e) partially cross-linking and solidifying the main component of the second material filled into the at least one cavity by treatment with energy, f) removing regions of the solidified negative-shape layer and/or of the solidified shaped-object layer projecting beyond a plane arranged at a predetermined distance from the base surface by material removal, g) repeating steps b) to f) at least once, wherein in a repeated step b), the first material is applied to the base surface and/or a previously formed shaped-object layer produced by steps b) to f), h) further cross-linking and solidifying the main component of the second material forming the shaped-object layers by heat treatment, wherein the second material has a greater strength than the solidified first material and/or the partially cross-linked second material, and i) removing the negative-shape layers from the shaped object before, while, and/or after the heat treatment is carried out.

2. The method according to claim 1, wherein the material portions of the first material are applied to the base surface and/or to the solidified negative-shape layer situated on the base surface and/or to a solidified shaped-object layer to form the negative-shape layer, the first material is a material that can be solidified by an application of energy, and energy is applied to solidify the negative-shape layer.

3. The method according to claim 1, wherein the main component comprises at least one epoxy, at least one oxetane, at least one functional (meth)acrylate, at least one vinyl ether, or a mixture of at least two of these substances.

4. The method according to claim 1, wherein the latent hardener contains dicyandiamide, acid anhydride, at least one blocked isocyanate, and/or at least one carbodiimide.

5. The method according to claim 1, wherein a concentration of the hardener in the second material is between 0.2 and 5% volume-percent.

6. The method according to claim 1, wherein the second material is applied to the negative-shape layer by a partially selective coating method, as a function of the geometry data, in such a manner that at least one material portion of the second material is dispensed into the at least one cavity, filling the at least one cavity completely.

7. The method according to claim 1, wherein the second material is a composite, which comprises a fluid and at least one additive, and the additive contains solid particles that are arranged in the fluid.

8. The method according to claim 1, wherein a pressure is applied to the second material, and the second material put under pressure is passed to at least one jet by way of at least one valve, an exit opening of the at least one jet is positioned along the base surface relative to the support part, and the at least one valve is controlled as a function of the geometry data made available for the shaped object to be produced and as a function of a relative position between the at least one jet and the support part, a material flow is released when the exit opening is positioned at the at least one cavity in such a manner that the second material can be dispensed into the at least one cavity by the at least one jet, and the material flow is blocked when the exit opening is positioned in such a manner that the second material cannot be dispensed into the at least one cavity by the at least one jet.

9. The method according to claim 1, wherein the second material is filled into the at least one cavity by a flexographic printing method, a gravure printing method, an offset printing method, a screen printing method, a laser transfer method, a micro-metering method, a doctor blade, a chamber doctor blade, and/or a powder application method, in a non-selective or partially selective manner.

10. The method according to claim 1, wherein before the main component of the second material is partially cross-linked, the second material filled into the at least one cavity is brought into contact with solid particles in such a manner that the solid particles penetrate, in whole and/or in part, into the second material situated in the at least one cavity.

11. The method according to claim 10, wherein the solid particles are applied to a mantle surface of a transfer roll as a solid-particle layer, and the mantle surface coated with the solid-particle layer is afterward positioned such that a surface of the second material filled into the at least one cavity comes into contact with the solid-particle layer while the mantle surface of the transfer roll is at a distance from the second material.

12. The method according to claim 1, wherein an uppermost solidified negative-shape layer and/or an uppermost solidified shaped-object layer is/are cleaned to remove waste that occurs during material removal.

13. The method according to claim 1, wherein the support part having the base surface is rotated about an axis of rotation during material application and/or during solidification of the first and/or second materials.

14. The method according to claim 1, wherein a solvent is provided, the solidified first material is solvent soluble, and before, while, and/or after the heat treatment is carried out, the negative-shape layers are brought into contact with the solvent in such a manner that the solidified first material dissolves in the solvent.

15. The method according to claim 1, wherein before, while, and/or after the heat treatment is carried out, the negative-shape layers are removed from the shaped object by a phase conversion of the solidified first material.

16. The method according to claim 1, wherein the material portions of the first material are applied by an inkjet printing method or a powder application method.

17. The method according to claim 6, wherein at least one location of the negative-shape layer situated outside of the at least one cavity is not brought into contact with the second material.

18. The method according to claim 10, wherein the solid particles are fibers.

19. The method according to claim 13, wherein the support part having the base surface is displaced along the axis of rotation during material application and/or during solidification of the first and second materials.

20. The method according to claim 1, wherein a concentration of the hardener in the second material is between 1.2 and 4% volume-percent.

21. The method according to claim 1, wherein a concentration of the hardener in the second material is between 2.2 and 3% volume-percent.

* * * * *